US012707457B2

(12) United States Patent
Yang et al.

(10) Patent No.: US 12,707,457 B2
(45) Date of Patent: Aug. 11, 2026

(54) UPLINK RESOURCE PRE-APPLICATION METHOD AND RELATED DEVICE

(71) Applicant: HUAWEI TECHNOLOGIES CO., LTD., Shenzhen (CN)

(72) Inventors: Haiquan Yang, Shanghai (CN); Bingguang Peng, Shanghai (CN); Ning He, Shanghai (CN); Lingchen Huang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 476 days.

(21) Appl. No.: 18/260,253

(22) PCT Filed: Dec. 9, 2021

(86) PCT No.: PCT/CN2021/136641
§ 371 (c)(1),
(2) Date: Jul. 3, 2023

(87) PCT Pub. No.: WO2022/151878
PCT Pub. Date: Jul. 21, 2022

(65) Prior Publication Data

US 2024/0064731 A1 Feb. 22, 2024

(30) Foreign Application Priority Data

Jan. 12, 2021 (CN) ........................ 202110040647.7

(51) Int. Cl.
*H04W 72/1268* (2023.01)

(52) U.S. Cl.
CPC .............................. *H04W 72/1268* (2013.01)

(58) Field of Classification Search
None
See application file for complete search history.

(56) References Cited

U.S. PATENT DOCUMENTS

2019/0215872 A1* 7/2019 Park .................. H04W 74/0833
2021/0250932 A1* 8/2021 Liu ........................ H04W 52/14
2022/0030115 A1* 1/2022 Wang .................. H04L 65/1083
2023/0125590 A1* 4/2023 Lin .................. H04W 74/0808 370/329
2023/0284289 A1* 9/2023 Watts ................... H04W 48/20 370/329

(Continued)

FOREIGN PATENT DOCUMENTS

CN 101600229 B 6/2011
CN 102792372 B 7/2014

(Continued)

*Primary Examiner* — Iqbal Zaidi
*Assistant Examiner* — Andrew Shaji Kurian

(57) ABSTRACT

Embodiments of this application provide an uplink resource pre-application method and a related device. An electronic device may predict encoding duration of a to-be-sent data packet in an application (APP), determine an encoding completion moment of the to-be-sent data packet, and send an uplink scheduling request to a network device before the encoding completion moment of the to-be-sent data packet, to apply for an uplink resource for the to-be-sent data packet in advance. In this way, a latency of sending uplink data by the electronic device may be reduced, and power consumption of the electronic device may be reduced.

17 Claims, 10 Drawing Sheets

(56) References Cited

U.S. PATENT DOCUMENTS

| | | | | |
|---|---|---|---|---|
| 2024/0365277 | A1* | 10/2024 | Rao | G01S 5/01 |
| 2024/0373431 | A1* | 11/2024 | Marinier | H04W 72/21 |
| 2025/0267673 | A1* | 8/2025 | Cirik | H04B 7/0617 |

FOREIGN PATENT DOCUMENTS

| | | | |
|---|---|---|---|
| CN | 107333143 | A | 11/2017 |
| WO | 2016197295 | A1 | 12/2016 |
| WO | 2017185951 | A1 | 11/2017 |
| WO | 2022106972 | A1 | 5/2022 |

* cited by examiner

Electronic device 100

1001

1002

Processor

Receiver

Bus

1005

Memory

Transmitter

1004

1003

UPLINK RESOURCE PRE-APPLICATION METHOD AND RELATED DEVICE

This application claims priority to Chinese Patent Application No. 202110040647.7, filed with the China National Intellectual Property Administration on Jan. 12, 2021 and entitled "UPLINK RESOURCE PRE-APPLICATION METHOD AND RELATED DEVICE", which is incorporated herein by reference in its entirety.

TECHNICAL FIELD

This application relates to the field of communication technologies, and in particular, to an uplink resource pre-application method and a related device.

BACKGROUND

With development of terminal technologies, an electronic device such as a smartphone or a tablet computer can support more and more different types of services, for example, a real-time media communication service, a cloud gaming service, and a cloud VR service. These services all require a lower end-to-end latency, and a high latency may cause a significant decline in user experience.

Currently, when uplink data needs to be sent, an electronic device needs to apply to a base station for an uplink resource. Because there is much signaling interaction between the electronic device and the base station, a latency of sending the uplink data is increased. Alternatively, the base station may periodically allocate the uplink resource to the electronic device within a period of time, for the electronic device to send the uplink data. In this way, although the latency of sending the uplink data is reduced, when the electronic device does not need to send the uplink data, the electronic device also needs to process the uplink resource allocated by the base station. Consequently, power consumption of the electronic device is increased.

Therefore, how to reduce the latency of sending the uplink data by the electronic device and reduce the power consumption of the electronic device is an urgent problem to be resolved in current research.

SUMMARY

Embodiments of this application provide an uplink resource pre-application method and a related device, so as to reduce a latency of sending uplink data by an electronic device, and reduce power consumption of the electronic device.

According to a first aspect, an embodiment of this application provides a communication method. The method includes: An electronic device encodes to-be-sent data to generate a to-be-sent data packet. The electronic device predicts, at an encoding start moment t0 of the to-be-sent data packet, encoding duration M of the to-be-sent data packet, and determines an encoding completion moment t1 of the to-be-sent data packet based on the encoding duration M of the to-be-sent data packet. The electronic device starts a timer, where an expiration moment t2 of the timer is earlier than the encoding completion moment t1 of the to-be-sent data packet, and a time interval from the expiration moment t2 of the timer to a moment of sending a first scheduling request SR after the encoding completion moment t1 of the to-be-sent data packet is one SR periodicity. The electronic device sends the SR to a network device at the expiration moment t2 of the timer. The electronic device receives uplink grant information UL Grant sent by the network device. The electronic device sends the to-be-sent data packet at the encoding completion moment t1 of the to-be-sent data packet by using an uplink resource indicated by the UL Grant.

According to the method provided in this embodiment of this application according to the first aspect, an electronic device may predict encoding duration of a to-be-sent data packet in an application (APP), determine an encoding completion moment of the to-be-sent data packet, and send an uplink scheduling request to a network device before the encoding completion moment of the to-be-sent data packet, to apply for an uplink resource for the to-be-sent data packet in advance. In this way, a latency of sending uplink data by the electronic device may be reduced, and power consumption of the electronic device may be reduced.

In a possible implementation, the expiration moment t2 of the timer is equal to a start moment t3 of the timer plus duration T of the timer, and the duration T of the timer is equal to duration from the start moment t3 of the timer to the encoding completion moment t1 of the to-be-sent data packet minus a time interval M3. The encoding completion moment t1 of the to-be-sent data packet is equal to the encoding start moment t0 of the to-be-sent data packet plus encoding duration M of the to-be-sent data packet. The time interval M3 is equal to a time interval M1 plus a time interval M2, the time interval M1 is a time interval from the expiration moment t2 of the timer to a moment at which the electronic device receives the uplink grant information UL Grant, and the time interval M2 is a time interval from the moment at which the electronic device receives the uplink grant information UL Grant to the encoding completion moment t1 of the to-be-sent data packet.

In a possible implementation, the time interval M1 is determined by the electronic device based on a first network configuration parameter, and the first network configuration parameter is obtained by the electronic device when the electronic device accesses the network device.

In a possible implementation, the time interval M2 is determined by the electronic device based on a second network configuration parameter, and the second network configuration parameter is obtained by the electronic device when the electronic device accesses the network device.

In a possible implementation, the electronic device includes: an application layer, an application interface layer, and a modem, where the application interface layer is used for communication between the application layer and the modem, the application interface layer provides a first interface, and the first interface is used by the application layer to transmit the encoding completion moment t1 of the to-be-sent data packet to the application interface layer.

In a possible implementation, the electronic device includes: the application layer, the application interface layer, and the modem, where the application interface layer is used for communication between the application layer and the modem, the application interface layer provides a second interface, the application interface layer is used to generate an AT command, the AT command carries the encoding completion moment t1 of the to-be-sent data packet, and the AT command is used to instruct the modem to start the timer; and the second interface is used by the application interface layer to transmit the AT command to the modem.

In a possible implementation, under the following condition, a step of the sending, by the electronic device, the SR to a network device at the expiration moment t2 of the timer is performed.

The encoding completion moment t1 of the to-be-sent data packet is earlier than a first moment, the first moment is equal to the expiration moment t2 of the timer plus the time interval M1 and a half of the SR periodicity, and the time interval M1 is the time interval from the expiration moment t2 of the timer to the moment at which the electronic device receives the uplink grant information UL Grant.

In a possible implementation, the to-be-sent data is image data captured by the electronic device.

According to a second aspect, an embodiment of this application provides an electronic device. The electronic device includes one or more processors and one or more memories, where the one or more memories are coupled to the one or more processors, the one or more memories are configured to store computer program code, the computer program code includes computer instructions, and when the one or more processors execute the computer instructions, the electronic device is enabled to perform the method according to any one of the possible implementations of the first aspect.

According to a third aspect, an embodiment of this application provides a computer storage medium. The computer storage medium stores a computer program, the computer program includes program instructions, and when the program instructions are run on an electronic device, the electronic device is enabled to perform the method according to any one of the possible implementations of the first aspect.

According to a fourth aspect, an embodiment of this application provides a chip, where the chip is applied to an electronic device, the chip includes one or more processors, and the processor is configured to invoke computer instructions to enable the electronic device to perform the method according to any one of the possible implementations of the first aspect.

According to a fifth aspect, an embodiment of this application provides a computer program product. When the computer program product runs on a computer, the computer is enabled to perform the method according to any one of the possible implementations of the first aspect.

DESCRIPTION OF EMBODIMENTS

The following clearly and completely describes technical solutions in embodiments of this application with reference to accompanying drawings in embodiments of this application. In description of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more than two.

It should be understood that in the specification, claims, and accompanying drawings of this application, terms "first", "second", and the like are intended to distinguish different objects but do not indicate a particular order. In addition, terms "comprise", "include", and any variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"An embodiment" mentioned in this application means that a specific feature, structure, or characteristic described with reference to this embodiment may be included in at least one embodiment of this application. The expression at various positions in this specification does not necessarily mean a same embodiment, and is not an independent or alternative embodiment mutually exclusive with other embodiments. It is understood explicitly and implicitly by a person skilled in the art that embodiments described in this application may be combined with other embodiments.

An uplink sending request is a technology commonly used in a cellular network. Data services are usually burst and discontinuous. A base station does not know when an electronic device sends uplink data, and therefore does not sure when the base station needs to perform uplink scheduling for the electronic device and allocate an uplink transmission radio resource (which may also be referred to as an uplink resource). The following two manners are usually used to solve the problem.

Figure 1:
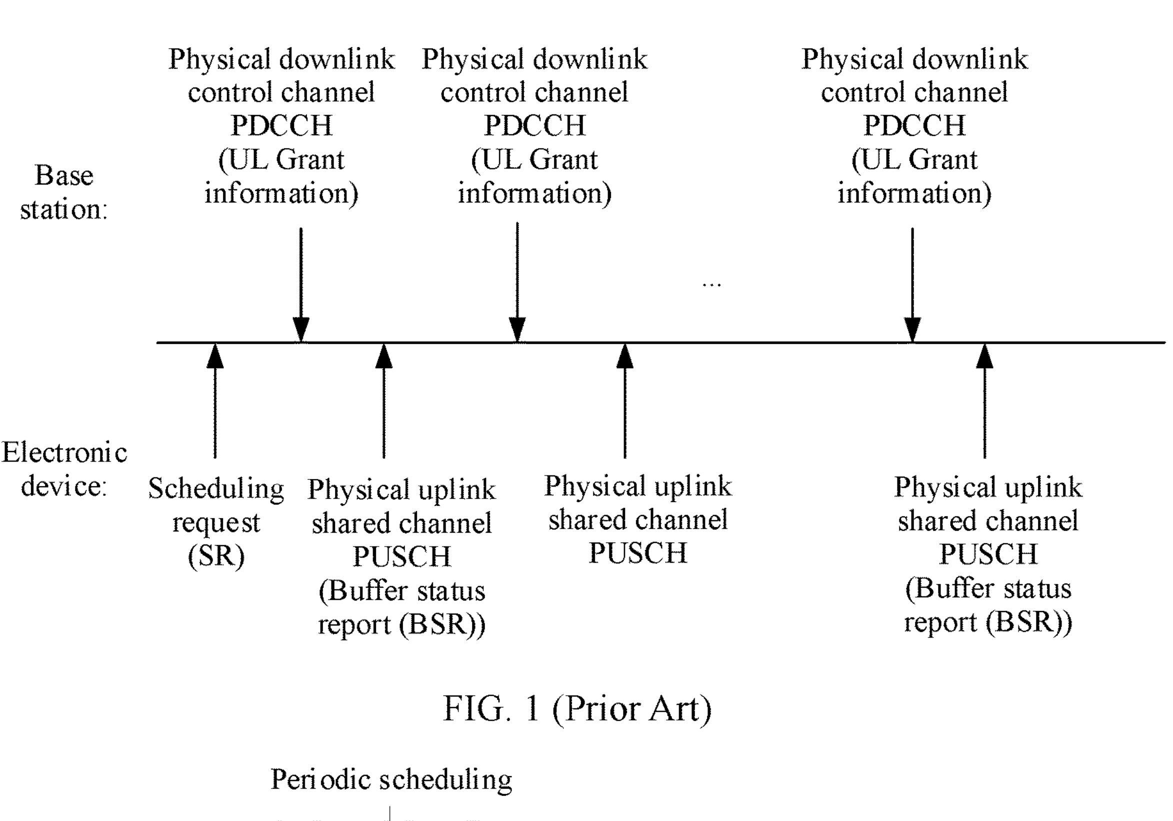
FIG. 1 is a schematic diagram of signaling interaction of uplink resource scheduling in the prior art.

Manner 1: As shown in FIG. 1, in a long term evolution (long term evolution, LTE) protocol and a new radio (new radio, NR) protocol, an electronic device is supported to first send a scheduling request (scheduling request, SR) to a base station when the electronic device needs to send uplink data. After receiving the SR, the base station schedules a physical uplink shared channel (physical uplink shared channel, PUSCH) for the electronic device, and allocates a small quantity of uplink resources to the electronic device by using uplink grant (UL Grant) information. Then, the electronic device may send a buffer status report (buffer status report, BSR) to the base station on the PUSCH, where the BSR may be used to notify the base station of how much uplink data needs to be sent by the electronic device. Then, the base station may schedule the PUSCH based on the BSR, and allocate the uplink resource to the electronic device by using the uplink grant (UL Grant) information. When all uplink data of the electronic device is sent, the electronic device reports the BSR to notify the base station that the electronic device has no uplink data to be sent, and the base station stops scheduling the PUSCH.

Figure 2:
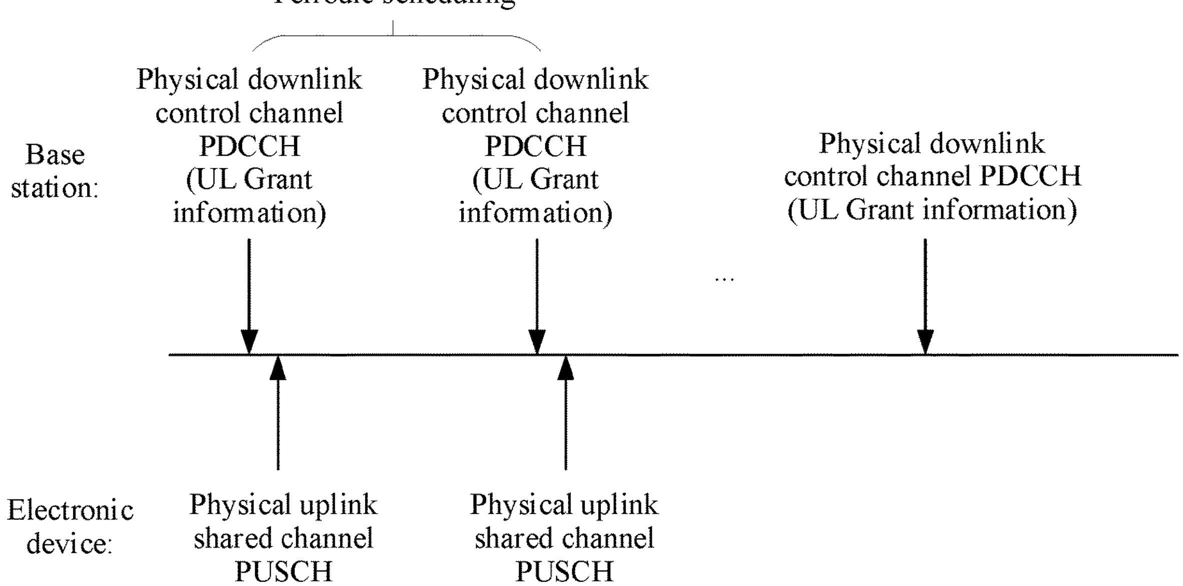
FIG. 2 is another schematic diagram of signaling interaction of uplink resource scheduling in the prior art.

Manner 2: As shown in FIG. 2, a pre-scheduling manner is used. A base station periodically schedules a PUSCH for an electronic device in a period of time, and allocates an uplink resource to the electronic device by using uplink grant (UL Grant) information. When the electronic device has uplink data to be sent, the electronic device may wait until a next scheduling periodicity arrives, and send, on the PUSCH scheduled by the base station, the uplink data to be sent. When the electronic device has no uplink data to be sent, the electronic device may send, when a next scheduling periodicity arrives, a padding (padding) packet on the PUSCH scheduled by the base station.

In the foregoing manner 1, when the electronic device needs to send the uplink data, the electronic device needs to send the SR to request the base station to schedule the PUSCH. In this case, a latency of sending the uplink data by the electronic device is high. For a service such as a real-time media communication service, a cloud VR service, or a cloud gaming service that require a lower latency, a high latency may cause a significant decline in user experience.

In the foregoing manner 2, when the electronic device needs to send the uplink data, the electronic device does not need to send the SR to request the base station to schedule the PUSCH. Therefore, a latency of sending the uplink data by the electronic device is lower than the latency in the foregoing manner 1. However, if the electronic device has no uplink data to be sent, the electronic device still needs to send the padding packet on the PUSCH scheduled by the base station, causing an increase in power consumption of the electronic device.

Embodiments of this application provide an uplink resource pre-application method. An electronic device may predict encoding duration of a to-be-sent data packet in an application (APP), determine an encoding completion moment of the to-be-sent data packet, and send an uplink scheduling request to a network device before the encoding completion moment of the to-be-sent data packet, to apply for an uplink resource for the to-be-sent data packet in advance. In this way, a latency of sending uplink data by the electronic device may be reduced, and power consumption of the electronic device may be reduced.

It should be noted that in embodiments of this application, "pre-application" means that the electronic device sends an uplink scheduling request to the network device in advance, to obtain the uplink resource used to send the to-be-sent data packet.

It should be understood that technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a code division multiple access (code division multiple access, CDMA) system, a universal mobile telecommunications system (universal mobile telecommunications system, UMTS), or a wireless local area network (wireless local area network, WLAN) system, and a fifth generation mobile communication (the 5th generation mobile communication, 5G) system, a 5G new radio (new radio, NR) system, or a communication system based on an orthogonal frequency division multiplexing (orthogonal frequency division multiplexing, OFDM) technology. This is not limited herein.

Figure 3:
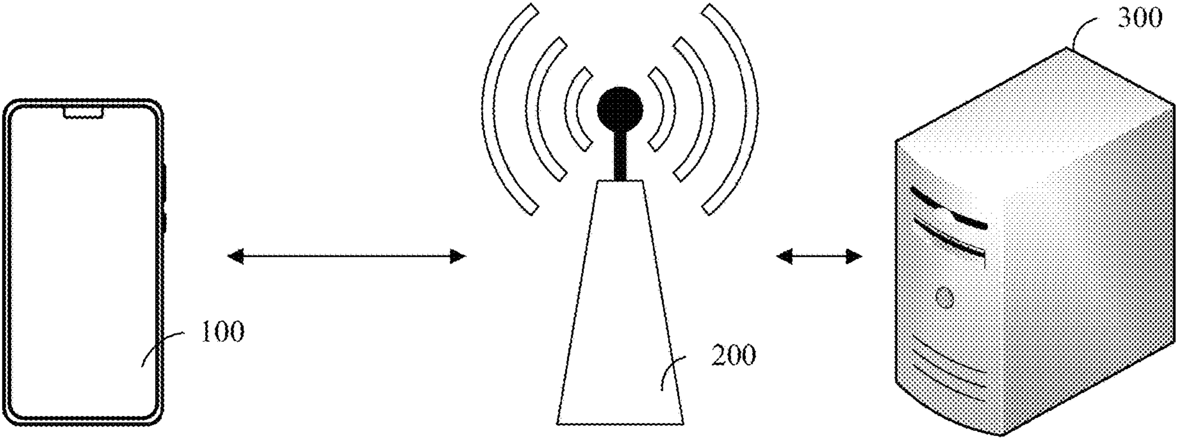
FIG. 3 is a schematic diagram of a structure of a mobile communication system according to an embodiment of this application.

FIG. 3 shows an example of an architecture of a mobile communication system provided in an embodiment of this application.

As shown in FIG. 3, the mobile communication system may include an electronic device 100, a radio access network device 200, and a core network device 300. The electronic device 100 is connected to the radio access network device 200 in a wireless manner, and the radio access network device 200 is connected to the core network device 300 in a wireless or wired manner. The core network device 300 and the radio access network device 200 may be independent and different physical devices, or functions of the core network device 300 and logical functions of the radio access network device 200 are integrated into a same physical device, or a part of functions of the core network device 300 and a part of functions of the radio access network device 200 are integrated into one physical device. The electronic device 100 may be at a fixed position, or may be mobile.

The radio access network device 200 (also referred to as a network device) is an access device that is used by the electronic device 100 to access the mobile communication system in a wireless manner, and has a wireless transceiver function. The device includes but is not limited to: an evolved NodeB (evolved NodeB, eNB), a radio network controller (radio network controller, RNC), a NodeB (NodeB, NB), a base station controller (base station controller, BSC), a base transceiver station (base transceiver station, BTS), a home NodeB (for example, home evolved NodeB, home NodeB, HNB), a baseband unit (baseband unit, BBU), or a next generation NodeB (next generation NodeB, gNB), a transmission point (TRP or TP), or a network node that forms a gNB or a transmission point in a 5G NR network, for example, a baseband unit (BBU) or a distributed unit (distribution unit, DU). Embodiments of this application do not limit a wireless access technology and a shape of the radio access network device 200.

The electronic device 100 may also be referred to as user equipment (user equipment, UE), an access terminal, a subscriber unit, a subscriber station, a mobile station, a remote station, a remote terminal, a mobile device, a user terminal, a terminal, a wireless communication device, a user agent, or a user apparatus. The electronic device in embodiments of this application may be a mobile phone (mobile phone), a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a handheld device, a vehicle-mounted device, a wearable device, or the like. This is not limited herein.

The radio access network device 200 and the electronic device 100 may be deployed on land, and include an indoor or outdoor device, a handheld device, or a vehicle-mounted device; may be deployed on water; or may be deployed on a plane and a satellite in the air. The embodiment of this application does not limit application scenarios.

It should be understood that FIG. 3 is merely a schematic diagram of the architecture of the mobile communication system. The mobile communication system may further include another device, for example, may further include a wireless relay device and a wireless backhaul device (not shown in FIG. 3). This is not limited herein. Quantities of electronic devices, radio access network devices, and core network devices included in the mobile communication system are not limited in this embodiment of this application.

In this embodiment of this application, the electronic device 100 communicates with the radio access network device 200 based on a radio air interface. At present, in a mobile communication system, communication protocol stacks may be divided into a physical layer, a data link layer, and a network layer. The data link layer may be divided into a user plane and a control plane. The user plane may include a packet data convergence protocol (packet data convergence protocol, PDCP) layer, a radio link control (radio link control, RLC) layer, and a media access control (media access control, MAC) layer. For example, the RLC layer and the MAC layer may be connected by using a logical channel (logic channel, LCH). For another example, the MAC layer is used to provide data transmission on the logical channel, and different logical channels are defined based on data of different service types. Amain function of the PDCP layer is to perform header compression and decompression for a user plane data packet. In addition, the PDCP layer further has a security function, for example, encryption and decryption for user plane data and control plane data, and integrity protection and verification for control plane data.

Scheduling in protocol stack is one of the core problems in wireless communication system research. Scheduling includes terminal scheduling, logical channel scheduling, and packet scheduling. The terminal scheduling is a process in which a radio access network device determines a quantity of resources used to send data to each terminal. The logical channel scheduling is a process in which the MAC layer determines how many resources are allocated to each logical channel at the RLC layer for data transmission. The packet scheduling is a process in which the logical channel determines how many control messages, retransmitted data, or new data are to be sent in a transmission opportunity. Embodiments of this application relate to the logical channel scheduling. The logical channel scheduling is also referred to as radio link resource scheduling or MAC scheduling.

Figure 4A:
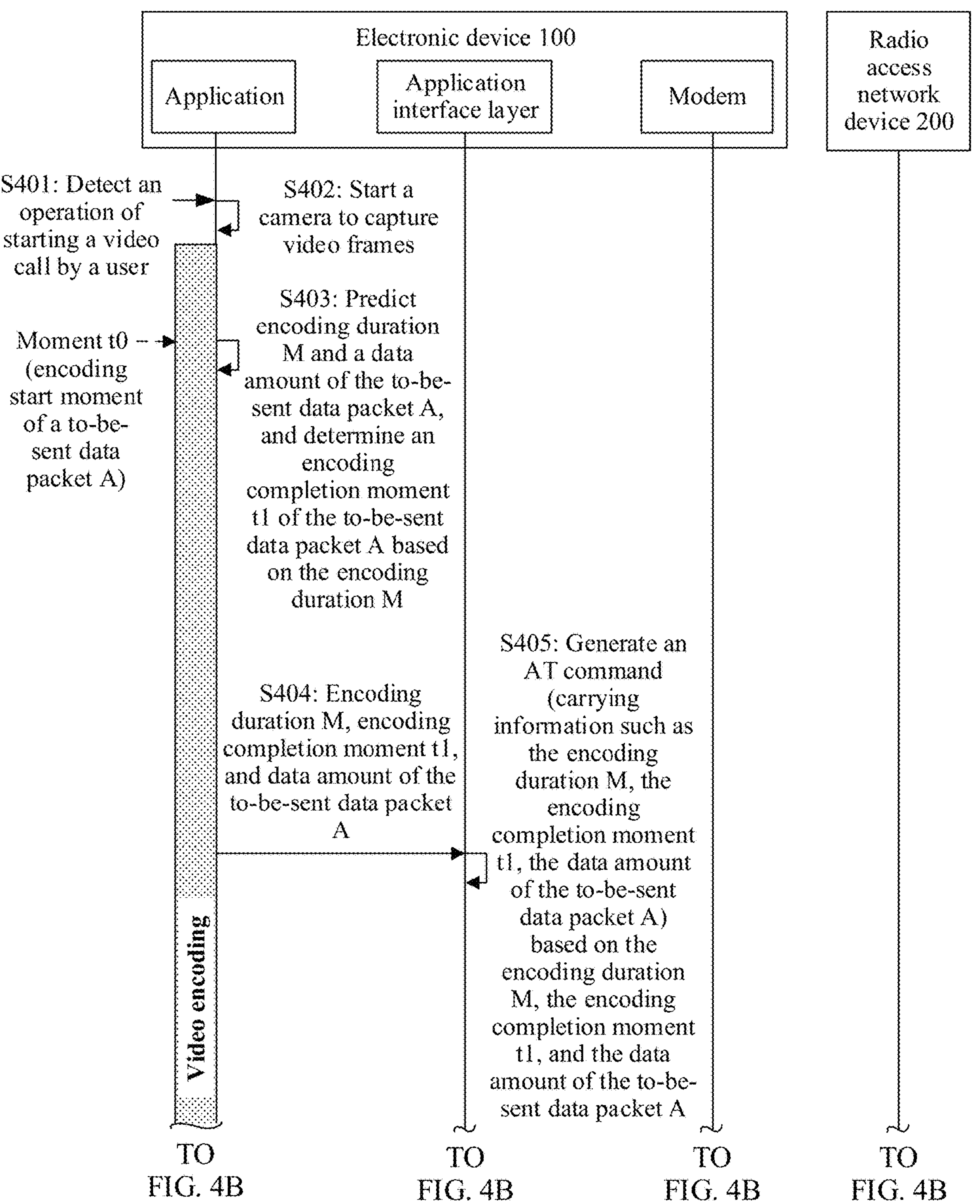
FIG. 4A and FIG. 4B are a schematic flowchart of an uplink resource pre-application method according to an embodiment of this application.
Figure 4B:
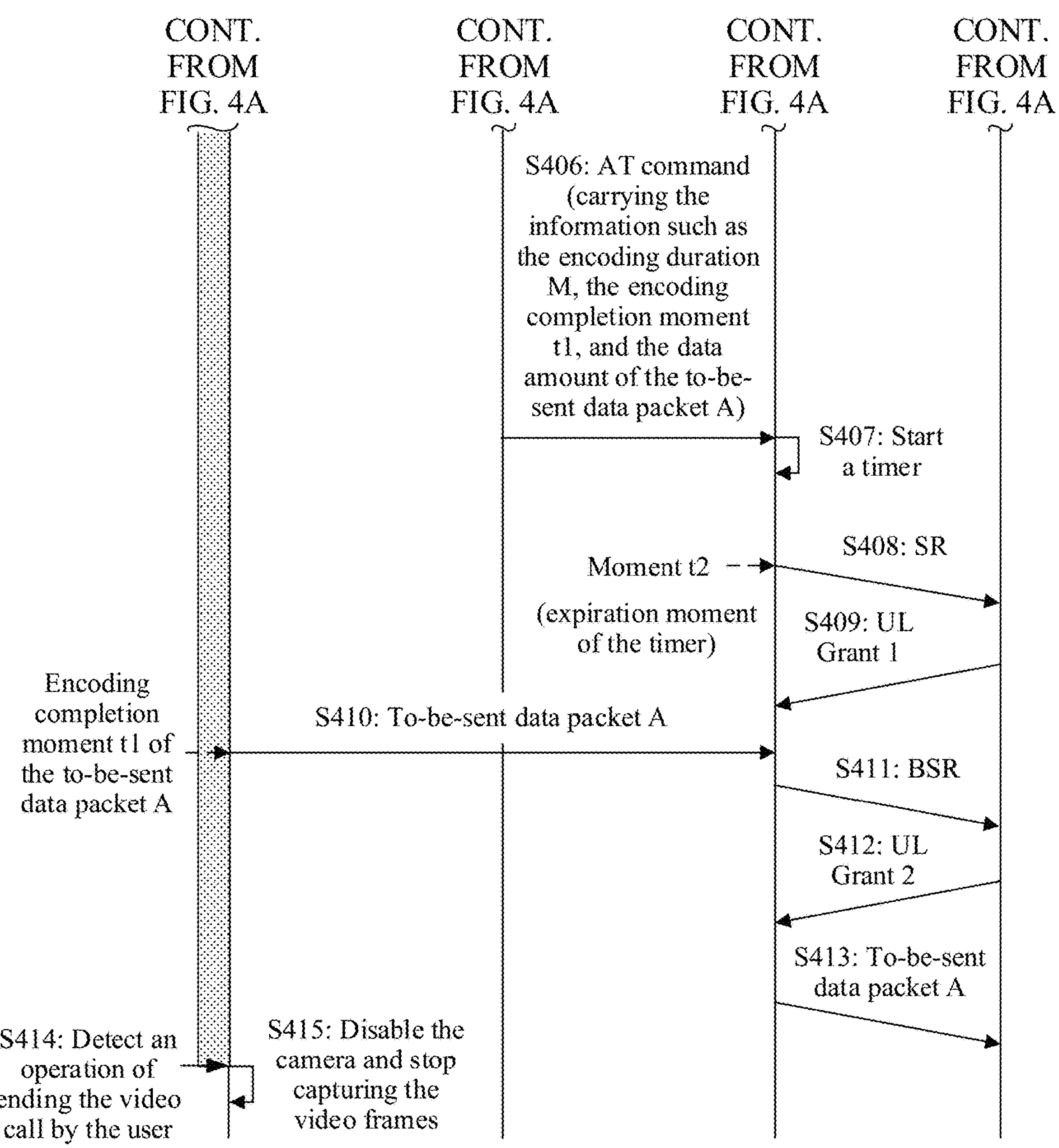

FIG. 4A and FIG. 4B show an example of a specific procedure of an uplink resource pre-application method according to an embodiment of this application.

Application Scenario: Video Call

As shown in FIG. 4A and FIG. 4B, the method may be applied to a communication system including an electronic device 100 and a radio access network device 200. The following describes in detail specific steps of the method.

S401 and S402: The electronic device 100 detects an operation of starting a video call by a user, for example, an operation of tapping a video call control on an application by the user, and the electronic device 100 may start a camera to capture video frames.

S403: The electronic device 100 may start to predict encoding duration M and a data amount of a to-be-sent data packet A at a moment t0 (an encoding start moment of the to-be-sent data packet A), and determine an encoding completion moment t1 of the to-be-sent data packet A based on the encoding duration M.

Specifically, in an entire video call process of the electronic device 100, the electronic device 100 continuously captures video frames and encodes the captured video frames. Therefore, a plurality of to-be-sent data packets (for example, the to-be-sent data packet A, a to-be-sent data packet B, and a to-be-sent data packet C) may be generated. The to-be-sent data packet A is used as an example. The electronic device 100 may start to accurately predict, at the moment t0 (the encoding start moment of the to-be-sent data packet A) based on information such as an image type in the captured video frame, the data amount of the to-be-sent data packet A and the duration for completing encoding of the to-be-sent data packet A, that is, the encoding duration M, so as to determine the encoding completion moment t1 of the to-be-sent data packet A based on the encoding duration M. Further, the electronic device 100 may further obtain information such as a data type of the to-be-sent data packet A.

S404: The electronic device 100 sends information such as the encoding duration M, the encoding completion moment t1, the data amount, and the data type of the to-be-sent data packet A to an application interface layer.

S405 and S406: After receiving the information such as the encoding duration M, the encoding completion moment t1, the data amount, and the data type of the to-be-sent data packet A, the application interface layer generates an AT command (attention command) based on the information. Then, the application interface layer sends the AT command to a modem. The AT command is an interface control command used for communication between an application and a modem, and may carry information such as the encoding duration M, the encoding completion moment t1, the data amount, the data type, a protocol data unit (protocol data unit, PDU) session ID, and a quality of service (quality of service, QoS) flow ID of the to-be-sent data packet A.

The application interface layer may provide a standard interface for the application, and the interface may be used to implement communication between the application and the modem. For example, the application interface layer may provide a first interface, where the first interface may be used by the application to transmit the information such as the encoding duration M, the encoding completion moment t1, the data amount, and the data type of the to-be-sent data packet A to the application interface layer. For another example, the application interface layer may further provide a second interface, where the second interface may be used by the application interface layer to transmit the generated AT command to the modem, and the AT command may be used to instruct the modem to start a timer.

S407: After receiving the AT command, the modem counts the data amount of the to-be-sent data packet A carried in the AT command into a corresponding logical channel and simultaneously starts the timer, and triggers, at an expiration moment t2 of the timer, an SR that arrives in a next scheduling periodicity to perform uplink resource pre-application.

Specifically, after receiving the AT command, the modem may count the data amount of the to-be-sent data packet A into the corresponding logical channel based on the information carried in the AT command. In addition, the modem may start the timer, and trigger, at the expiration moment t2 of the timer, the SR that arrives in the next scheduling periodicity to perform uplink resource pre-application. The uplink resource is used by the electronic device 100 to send the to-be-sent data packet A to the radio access network device 200. In other words, before the encoding completion moment t1 of the to-be-sent data packet A arrives, the electronic device 100 needs to perform uplink resource pre-application and finish applying for the uplink resource in advance. In this case, when the encoding completion moment t1 of the to-be-sent data packet A arrives, the electronic device 100 may send the to-be-sent data packet A to the radio access network device 200 by using the uplink resource that is applied for in advance.

Figure 5:
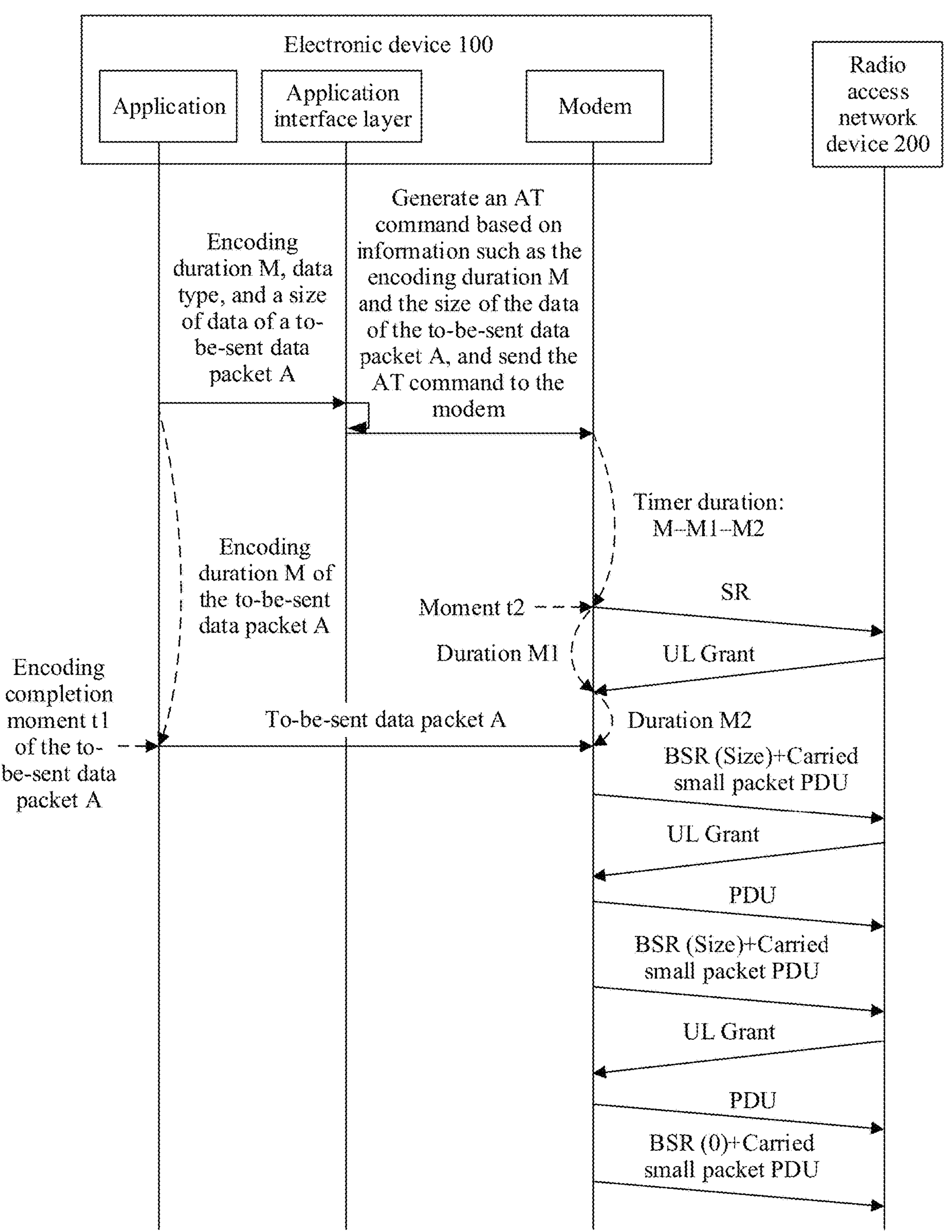
FIG. 5 is a schematic diagram of a method for setting duration of a timer according to an embodiment of this application.

In a possible implementation, timer duration T may be calculated by using the following method. If duration of performing step S403 to step S406 shown in FIG. 4A and FIG. 4B is ignored, it is considered that the encoding start moment t0 of the to-be-sent data packet A is equal to a moment (a start moment t3 of the timer) for starting the timer. As shown in FIG. 5, the timer duration T=M−M1−M2, where M>(M1+M2), M is the encoding duration M for encoding the to-be-sent data packet A, M1 is a time interval from a moment at which the electronic device 100 starts to send the SR to the radio access network device 200 (the expiration moment t2 of the timer shown in FIG. 4A and FIG. 4B) to a moment at which the electronic device 100 receives uplink grant information UL Grant sent by the radio access network device 200, and M2 is a time interval from a moment at which the electronic device 100 receives the uplink grant information UL Grant to the encoding completion moment t1 of the to-be-sent data packet A. The encoding duration M may be accurately predicted, while M1 and M2 need to be further determined based on a plurality of network configuration parameters such as an SR periodicity, a scheduling policy of the radio access network device 200, a channel condition, TDD/FDD, and numerology. For example, when the radio access network device 200 is congested, M1 increases; or when the radio access network device 200 is idle, M1 decreases. For another example, the electronic device 100 may determine, based on a service type of uplink data carried on the logical channel, a priority of sending the uplink data on each logical channel. If the priority is high, M2 decreases; or if the priority is low, M2 increases. In other words, a value of M1 needs to be further determined based on a plurality of network configuration parameters (which may also be referred to as a first network configuration parameter), and a value of M2 also needs to be further determined based on a plurality of network configuration parameters (which may also be referred to as a second network configuration parameter), to avoid a waste of uplink resources as much as possible. The plurality of network configuration parameters may be obtained when the electronic device 100 accesses the radio access network device 200.

It should be noted that M1 and M2 may increase in some cases, which causes some negative latency benefits, but a beneficial effect of this solution is not affected. For example, when the radio access network device 200 is congested, M1 increases, and time at which the radio access network device 200 sends the uplink grant information UL Grant to the electronic device 100 is delayed. Consequently, some negative latency benefits may be generated. However, because delayed duration is very short, in terms of total latency benefits, in comparison with a method of not performing uplink resource pre-application, in the uplink resource pre-application method in this solution, positive latency benefits are still generated, and the beneficial effect of this solution is not affected.

In a possible implementation, the expiration moment t2 of the timer may be calculated by using the following method. The expiration moment t2 of the timer is equal to the start moment t3 of the timer plus the timer duration T. The timer duration T is equal to duration from the start moment t3 of the timer to the encoding completion moment t1 of the to-be-sent data packet A minus the time interval M3. The encoding completion moment t1 of the to-be-sent data packet A is equal to the encoding start moment t0 of the to-be-sent data packet A plus the encoding duration M. The time interval M3 is equal to the time interval M1 plus the time interval M2, where the time interval M1 is the time interval from the expiration moment t2 of the timer to the moment at which the electronic device 100 receives the uplink grant information UL Grant sent by the radio access network device 200, and the time interval M2 is the time interval from the moment at which the electronic device 100 receives the uplink grant information UL Grant sent by the radio access network device 200 to the encoding completion moment t1 of the to-be-sent data packet A.

Still refer to FIG. 5. The BSR may be carried by a media access control (media access control, MAC) protocol data unit (protocol data unit, PDU), and is used to report, to the radio access network device 200, how much uplink data (which may be learned based on the data amount carried in the BSR) needs to be sent by the electronic device 100. Then, the radio access network device 200 allocates the uplink resource to the electronic device 100 by sending the uplink grant (UL Grant) information. When all uplink data of the electronic device 100 is sent, the electronic device 100 reports the BSR to notify the radio access network device 200 that the electronic device 100 has no uplink data to be sent (that is, a size of the data carried in the BSR is 0), and the base station stops uplink resource scheduling.

S408: The electronic device 100 may send an SR request to the radio access network device 200 at the moment t2, to notify the radio access network device 200 that the electronic device 100 has uplink data to be sent.

S409: After receiving the SR request, the radio access network device 200 may schedule a PUSCH for the electronic device 100 based on a network resource status, and allocate a small quantity of uplink resources to the electronic device 100 by sending UL Grant 1, and the uplink resources may be used by the electronic device 100 to send a BSR in step S411 to the radio access network device 200.

S410 to S413: At the encoding completion moment t1 of the to-be-sent data packet A, the application in the electronic device 100 may send the to-be-sent data packet A to the modem. The modem may send the BSR to the radio access network device 200 on the PUSCH. The BSR may include information such as the data amount of the to-be-sent data packet A, and is used to notify the radio access network device 200 of how much uplink data needs to be sent by the electronic device 100. The radio access network device 200 may schedule the PUSCH based on the BSR, and allocate an uplink resource to the electronic device 100 by sending UL Grant 2. Step S411 and step S412 may be continuously performed until all uplink data (all data in the to-be-sent data packet A) of the electronic device 100 is sent. The electronic device 100 reports the BSR to the radio access network device 200, to notify the radio access network device 200 that no uplink data needs to be sent by the electronic device 100, and the radio access network device 200 stops scheduling the PUSCH.

S414 and S415: The electronic device 100 detects an operation of ending the video call by the user, for example, an operation of tapping an ending video call control on the application by the user, and the electronic device 100 may disable the camera and stop capturing the video frames.

This embodiment of this application provides the uplink resource pre-application method. The electronic device may predict the information such as the encoding duration and the data amount of the to-be-sent data packet in the application (APP), and determine the encoding completion moment of the to-be-sent data packet. Then, the electronic device may send the uplink scheduling request to the radio access network device before the encoding completion moment of the to-be-sent data packet arrives, to apply for the uplink resource for the to-be-sent data packet in advance. In other words, uplink resource pre-application is performed. In this case, when the encoding completion moment of the to-be-sent data packet arrives, the electronic device may send the to-be-sent data packet to the radio access network device by using the uplink resource that has been applied for. In this way, in comparison with uplink pre-scheduling or semi-persistent scheduling, the latency of sending the uplink data by the electronic device can be reduced, the power consumption of the electronic device is reduced, and an application scenario is more flexible. In addition, by using this method, an existing uplink scheduling procedure in the 3rd generation partnership project (3rd generation partnership project, 3GPP) is not changed, and the method is easy to implement, with low development costs.

It should be noted that in this embodiment of this application, the uplink resource pre-application method is described in detail by using only the application scenario of the video call as an example, and is not limited to the application scenario of the video call. The uplink resource pre-application method provided in this embodiment of this application is also applicable to another application scenario (for example, an audio call, a cloud game, or industrial sensor data collection and transmission). This is not limited herein.

Figure 6A:
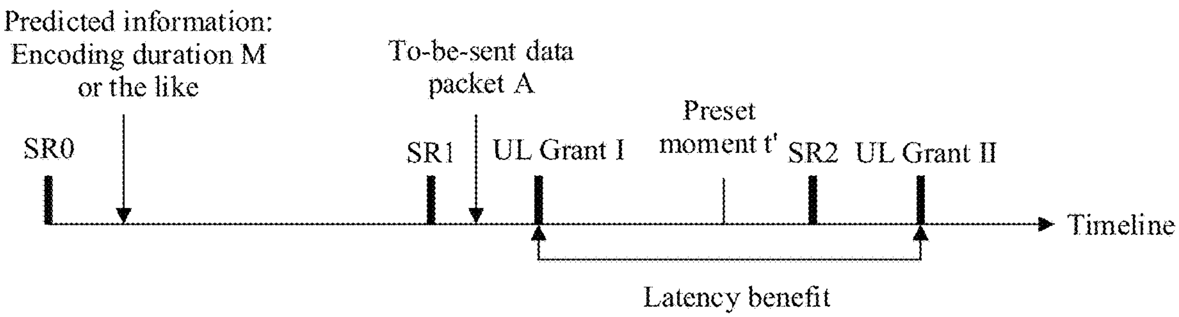
FIG. 6A to FIG. 6C are schematic diagrams of latency benefits of sending uplink data after uplink resource pre-application is performed in different cases according to an embodiment of this application.
Figure 6B:
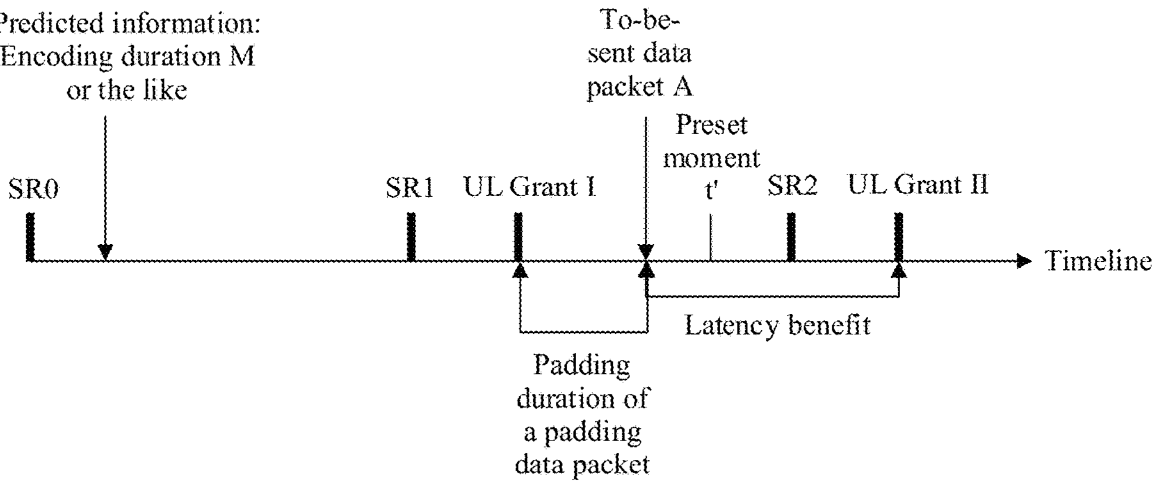
Figure 6C:
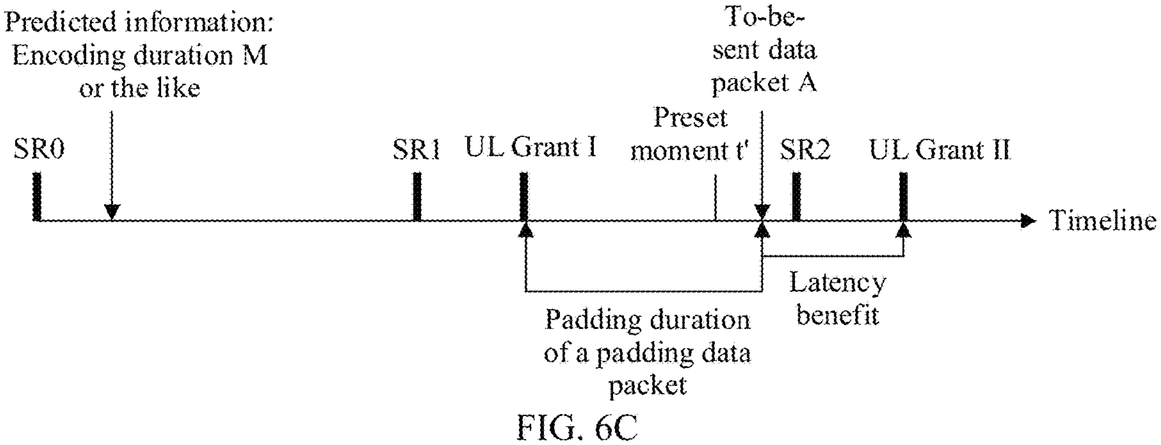

FIG. 6A to FIG. 6C show examples of latency benefits of sending uplink data after uplink resource pre-application is performed in different cases according to this embodiment of this application. Detailed descriptions are as follows.

When the radio access network device 200 stops pre-scheduling, it is assumed that a sending moment of an SR0 is t_SR0, a sending moment of an SR1 is t_SR1 (that is, the expiration moment t2 of the timer described above), a sending moment of an SR2 is t_SR2 (that is, a sending moment of a first SR after the encoding completion moment t1 of the to-be-sent data packet A), an arrival moment of predicted information (including the information such as the encoding duration M, the encoding completion moment t1, the data amount, or the data type of the to-be-sent data packet A) is t_prepacket, an arrival moment of UL Grant I is t_ulgrant I, and an arrival moment of UL Grant II is t_ulgrant II. In this case, an SR periodicity may be T_SR=t_SR1−t_SR0=t_SR2−t_SR1=t_ulgrant II−t_ulgrant I.

In this embodiment of this application, t'=t_ulgrant I−t_SR1+T_SR/2 is used as an example for describing a preset moment t'. A method for determining the preset moment t' (which may also be referred to as a first moment) is described in detail in subsequent content, and details are not described herein.

Case 1: An arrival moment t1_packet (the encoding completion moment t1 of the to-be-sent data packet A) of the to-be-sent data packet A is between the sending moment t_SR1 of the SR1 and the arrival moment t_ulgrant I of the UL Grant I.

FIG. 6A shows an example of latency benefits of sending uplink data after uplink resource pre-application is performed in the case 1.

As shown in FIG. 6A, if the technical solution (where the uplink resource pre-application is performed before the arrival moment of the to-be-sent data packet A) in this embodiment of this application is used, that is, the uplink resource is applied at the moment t_SR1, the electronic device 100 may start to send the to-be-sent data packet A to the radio access network device 200 at the moment t_ulgrant I. Because the electronic device 100 has the uplink data (the foregoing to-be-sent data packet A) to be sent at the moment t_ulgrant I, a padding data packet does not need to be used to process the uplink resource allocated by the radio access network device 200. If a baseline solution (where uplink resource pre-application is not performed before the arrival moment of the to-be-sent data packet A) is used, because the arrival moment t1_packet of the to-be-sent data packet A is later than the sending moment t_SR1 of the SR1, the electronic device 100 may only wait for the SR2 that arrives in a next periodicity, that is, may only wait until the sending moment t_SR2 of the SR2 to start to apply for the uplink resource. Therefore, the electronic device 100 may only start to send the to-be-sent data packet A to the radio access network device 200 at the moment t_ulgrant II.

It may be learned from FIG. 6A that, when the technical solution in this embodiment of this application is used, in comparison with the baseline solution, the latency benefits ΔT=T_SR=t_ulgrant II−t_ulgrant I.

In this embodiment of this application, a rate of wasting the padding data packet may be a ratio of padding duration of the padding data packet to the SR periodicity T_SR.

It may be learned from FIG. 6A that, in the case 1, no padding data packet needs to be used, that is, padding duration of the padding data packet is 0. Therefore, the rate of wasting the padding data packet in the case 1 is 0.

Case 2: An arrival moment t2_packet (the encoding completion moment t1 of the to-be-sent data packet A) of the to-be-sent data packet A is between the arrival moment t_ulgrant I of the UL Grant I and the preset moment t'.

FIG. 6B shows an example of latency benefits of sending uplink data after uplink resource pre-application is performed in the case 2.

As shown in FIG. 6B, if the technical solution (where the uplink resource pre-application is performed before the arrival moment of the to-be-sent data packet A) in this embodiment of this application is used, the uplink resource is requested at the moment t_SR1. Because the to-be-sent data packet A has not arrived at the moment t_ulgrant I, the electronic device 100 may report the BSR to the radio access network device 200, where the BSR carries predicted data amount information of the to-be-sent data packet A, and the radio access network device 200 may allocate a corresponding uplink resource to the electronic device 100 based on the data amount information carried in the BSR. If the to-be-sent data packet A has not arrived at the moment, the electronic device 100 needs to use the padding data packet to process the uplink resource allocated by the radio access network device 200. The electronic device 100 may simultaneously continue to report the BSR to the radio access network device 200, and the electronic device 100 starts to send the to-be-sent data packet A to the radio access network device 200 only until the to-be-sent data packet A arrives at the moment t2_packet. In other words, before the to-be-sent data packet A arrives, the electronic device 100 needs to process, by using the padding data packet, the uplink resource obtained by reporting the BSR to the radio access network device 200.

If a baseline solution (where no uplink resource pre-application is performed before the arrival moment of the to-be-sent data packet A) is used, because the arrival moment t2_packet of the to-be-sent data packet A is later than the sending moment t_SR1 of the SR1, the electronic device 100 may only wait for SR2 that arrives in a next periodicity, that is, may only wait until the sending moment t_SR2 of the SR2 to start to apply for the uplink resource. Therefore, the electronic device 100 may only start to send the to-be-sent data packet A to the radio access network device 200 at the moment t_ulgrant II.

It may be learned from FIG. 6B that, when the technical solution in this embodiment of this application is applied, in comparison with the baseline solution, the latency benefits ΔT=T_SR−T_padding, where T_padding is the padding duration of the padding data packet, and T_padding=t2_packet−t_ulgrant I. In the case 2, a padding data packet waste rate is T_padding/T_SR. Because T_padding is greater than 0, and T_SR is greater than 0, the padding data packet waste rate is greater than 0 in the case 2.

Case 3: An arrival moment t3_packet (the encoding completion moment t1 of the to-be-sent data packet A) of the to-be-sent data packet A is between the preset moment t' and the sending moment t_SR2 of the SR2.

As shown in FIG. 6C, if the technical solution (where the uplink resource pre-application is performed before the arrival moment of the to-be-sent data packet A) in this embodiment of this application is used, the uplink resource is requested at the moment t_SR1. Because the to-be-sent data packet A has not arrived at the moment t_ulgrant I, the electronic device 100 may report the BSR to the radio access network device 200, where the BSR carries predicted data amount information of the to-be-sent data packet A, and the radio access network device 200 may allocate a corresponding uplink resource to the electronic device 100 based on the data amount information carried in the BSR. If the to-be-sent data packet A has not arrived at the moment, the electronic device 100 needs to use the padding data packet to process the uplink resource allocated by the radio access network device 200. The electronic device 100 may simultaneously continue to report the BSR to the radio access network device 200, and the electronic device 100 starts to send the to-be-sent data packet A to the radio access network device 200 only until the to-be-sent data packet A arrives at the moment t3_packet. In other words, before the to-be-sent data packet A arrives, the electronic device 100 needs to process, by using the padding data packet, the uplink resource obtained by reporting the BSR to the radio access network device 200.

If a baseline solution (no uplink resource pre-application is performed before the arrival moment of the to-be-sent data packet A) is used, because the arrival moment t3_packet of the to-be-sent data packet A is later than the sending moment t_SR1 of the SR1, the electronic device 100 may only wait for SR2 that arrives in a next periodicity, that is, may only wait until the sending moment t_SR2 of the SR2 to start to apply for the uplink resource. Therefore, the electronic device 100 may only start to send the to-be-sent data packet A to the radio access network device 200 at the moment t_ulgrant II.

It may be learned from FIG. 6C that, when the technical solution in this embodiment of this application is applied, in comparison with the baseline solution, the latency benefits are T_SR−T'_padding, where T'_padding is the padding duration of the padding data packet, and T'_padding=t3_packet−t_ulgrant I. In the case 3, a padding data packet waste rate is T'_padding/T_SR. Because T'_padding is greater than 0 and greater than the foregoing T_padding, and T_SR is greater than 0, the padding data packet waste rate in the case 3 is greater than 0 and is greater than the padding data packet waste rate in the case 2.

It can be easily learned from FIG. 6A to FIG. 6C that the latency benefit occurs only when an interval between an arrival moment of the predicted information and the arrival moment of the to-be-sent data packet A is greater than the SR periodicity. Otherwise, no latency benefit occurs.

TABLE 1

| | Present solution (where uplink resource pre-application is performed) | Baseline solution (where uplink resource pre-application is not performed) | Latency benefit (latency of the baseline solution-latency of the present solution) | Padding duration of the padding data packet | Comprehensive value |
|---|---|---|---|---|---|
| Case 1 | Start to apply for the uplink resource at the moment t_SR1 | Start to apply for the uplink resource at the moment t_SR2 | T_SR | 0 | High |
| Case 2 | Start to apply for the uplink resource at the moment t_SR1 | Start to apply for the uplink resource at the moment t_SR2 | T_SR-T_padding | T_padding | Medium (where the preset moment t' is determined based on half of the latency benefit T_SR/2 in the case 1) |
| Case 3 | Start to apply for the uplink resource at the moment t_SR1 | Start to apply for the uplink resource at the moment t_SR2 | T_SR-T'_padding | T'_padding | Low |

According to a combination of FIG. 6A to FIG. 6C and Table 1, in the case 1, the latency benefit is the largest, and padding by using the padding data packet is not required, that is, the padding data packet waste rate is 0. In the case 2, the latency benefit is less than that in the case 1, and padding by using the padding data packet is required, that is, the padding data packet waste rate is greater than 0 and is greater than that in the case 1. In the case 3, the latency benefit is the smallest, padding by using the padding data packet is required, and the padding duration T'_padding of the padding data packet is greater than the padding duration T_padding of the padding data packet in the case 2, that is, the padding data packet waste rate is greater than that in the case 2.

Figure 7A:
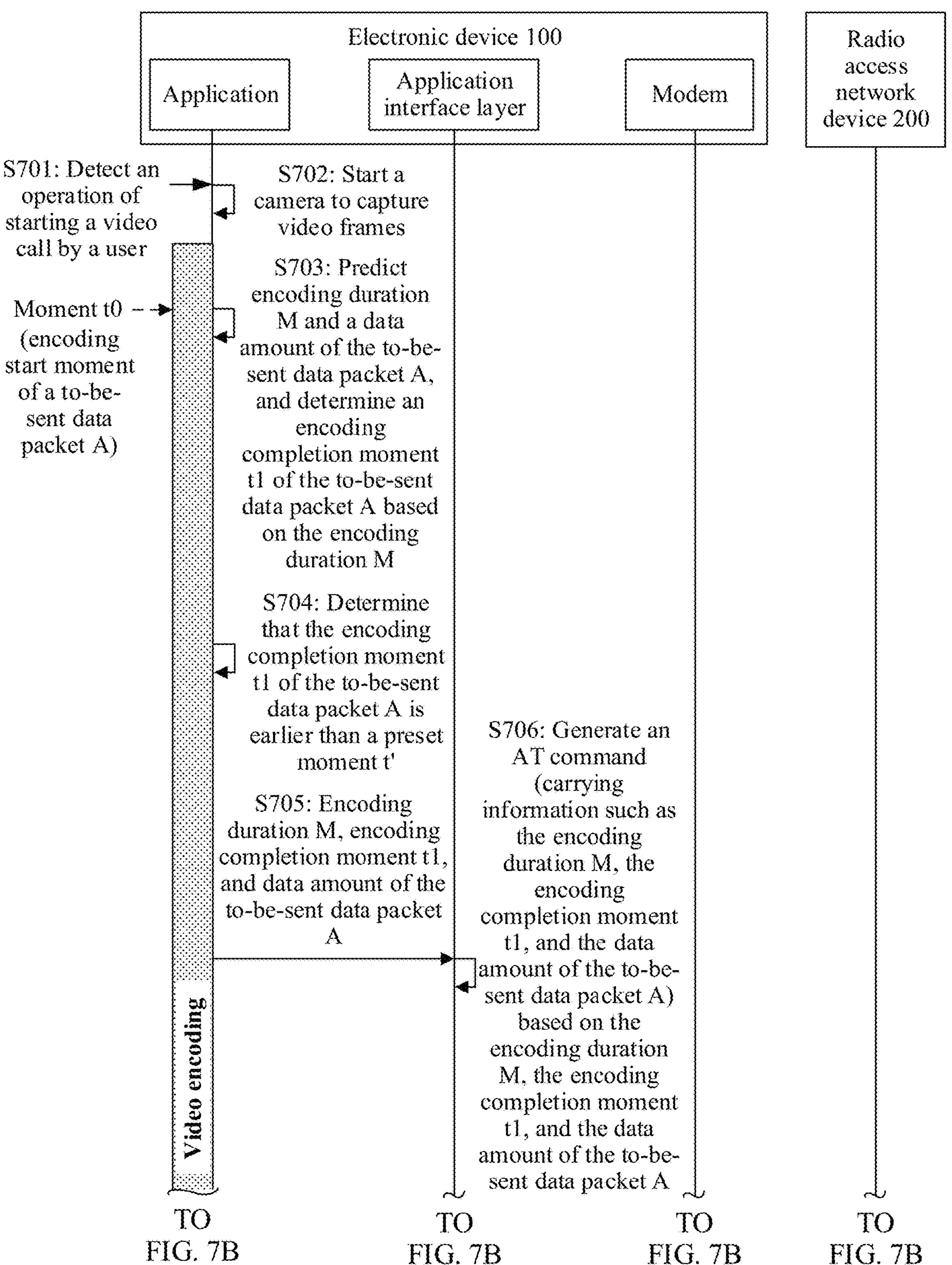
FIG. 7A and FIG. 7B are another schematic flowchart of an uplink resource pre-application method according to an embodiment of this application.
Figure 7B:
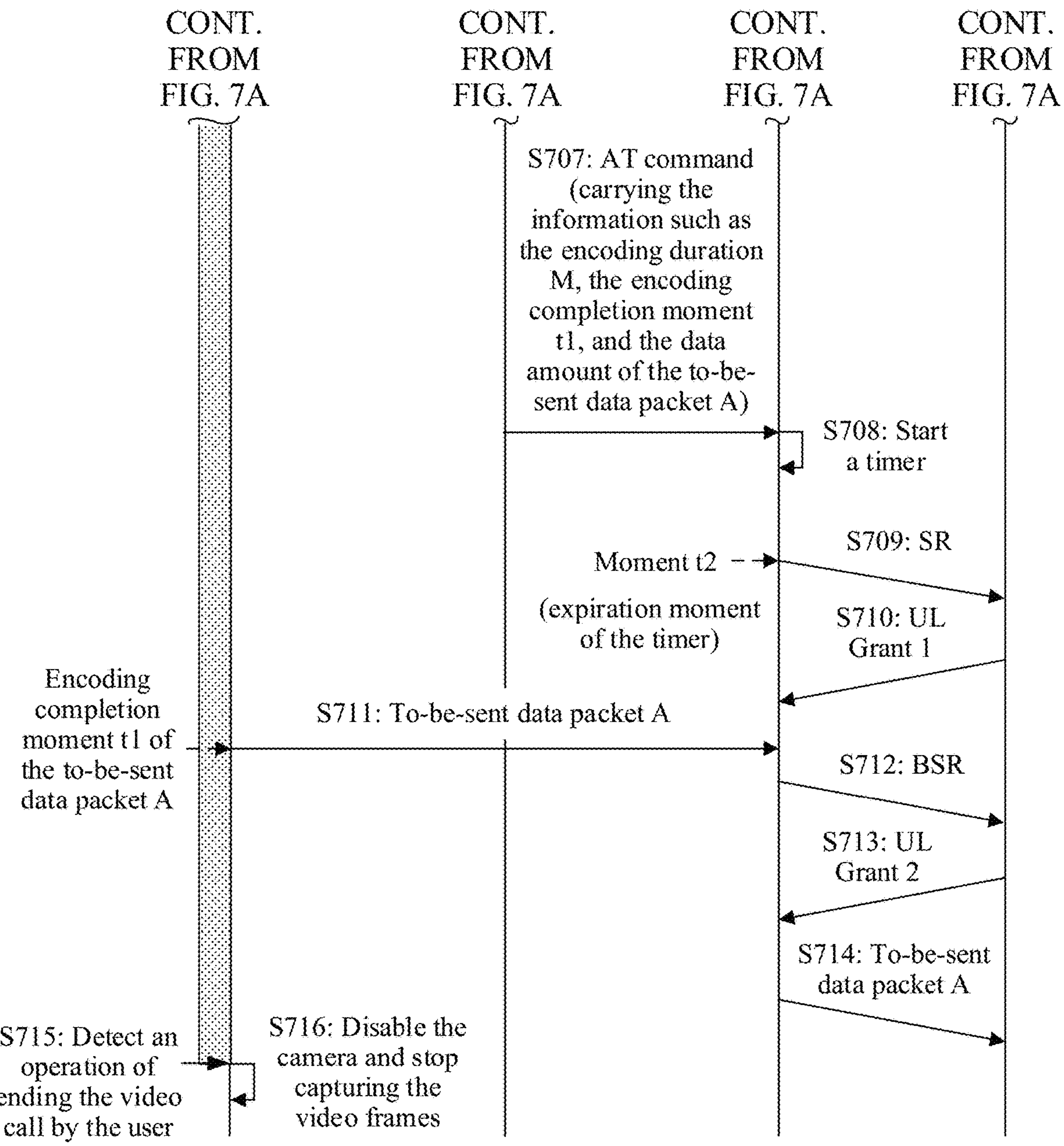

To comprehensively consider the latency benefit and a padding data packet waste, as shown in FIG. 7A and FIG. 7B, an embodiment of this application provides another uplink resource pre-application method. Whether to perform uplink resource pre-application may be determined based on the encoding completion moment of the to-be-sent data packet A. For example, if the encoding completion moment t1 of the to-be-sent data packet A is earlier than the preset moment t', the uplink resource pre-application is performed. If the encoding completion moment t1 of the to-be-sent data packet A is later than the preset moment t', in this case, the uplink resource pre-application is not performed. In this way, a latency of sending uplink data can be reduced, and the waste of padding data packet can be reduced, thereby reducing power consumption of the electronic device.

A method for determining the preset moment f in this embodiment of this application is as follows. In the case 1 shown in FIG. 6A, the latency benefit is the largest and no padding data packet is wasted. In the case 2 shown in FIG. 6B and the case 3 shown in FIG. 6C, the latency benefits are reduced and padding data packets are wasted. It is easy to understand that the latency benefit in the case 1 is equal to a sum of the latency benefit and the padding duration of the padding data packet in the case 2 or the case 3. In other words, if the latency benefit is reduced, the padding duration of the padding data packet is increased. Consequently, to comprehensively consider the latency benefit and the padding data packet waste, a half of the latency benefit T_SR/2 in the case 1 shown in FIG. 6A is used as a critical point, and a corresponding preset moment t' is t'=t_ulgrant I−t_SR1+T_SR/2.

It may be understood that, in this embodiment of this application, the preset moment f=t_ulgrant I−t_SR1+T_SR/2 is merely used as an example. The preset moment t' may be alternatively adaptively adjusted based on different application scenarios or different requirements. This is not limited herein.

FIG. 7A and FIG. 7B are a specific procedure of another uplink resource pre-application method according to an embodiment of this application.

Application Scenario: Video Call

As shown in FIG. 7A and FIG. 7B, the method may be applied to a communication system including an electronic device 100 and a radio access network device 200. The following describes in detail specific steps of the method.

S701 and S702: The electronic device 100 detects an operation of starting a video call by a user, for example, an operation of tapping a video call control on an application by the user, and the electronic device 100 may start a camera to capture video frames.

S703: The electronic device 100 may start to predict encoding duration M and a data amount of a to-be-sent data packet A at a moment t0 (an encoding start moment of the to-be-sent data packet A), and determine an encoding completion moment t1 of the to-be-sent data packet A based on the encoding duration M.

For a specific execution process of steps S701 to S703, refer to related content in steps S401 to S403 in the embodiment shown in FIG. 4A and FIG. 4B. Details are not described herein again.

S704: The electronic device 100 determines, based on the predicted encoding completion moment t1 of the to-be-sent data packet A, that the encoding completion moment t1 of the to-be-sent data packet A is earlier than the preset moment t'.

Specifically, the electronic device 100 may determine, based on the predicted encoding completion moment t1 of the to-be-sent data packet A, whether the encoding completion moment t1 of the to-be-sent data packet A is earlier than the preset moment t'. If yes, the electronic device 100 may continue to perform step S705 and subsequent steps. At a moment t2, the electronic device 100 sends an SR to the radio access network device 200, that is, the uplink resource pre-application is performed. If no, the electronic device 100 may not continue to perform step S705 and subsequent steps, or the electronic device 100 may continue to perform step S705 to step S708. However, at the moment t2, the electronic device 100 does not send the SR to the radio access network device 200, that is, the uplink resource pre-application is not performed.

For example, as shown in FIG. 6C, the encoding completion moment t1 (that is, the arrival moment t3_packet of the to-be-sent data packet A in FIG. 6C) of the to-be-sent data packet A is later than the preset moment t'. In this case, the electronic device 100 may only wait until the sending moment t_SR2 of the SR2 to start to apply for the uplink resource, and does not perform uplink resource pre-application. Therefore, the padding data packet waste can be reduced.

The preset moment t' may be adaptively adjusted based on different application scenarios or different requirements. This is not limited in this embodiment of this application.

S705: The electronic device 100 sends information such as the encoding duration M, the encoding completion moment t1, the data amount, and the data type of the to-be-sent data packet A to an application interface layer.

S706 and S707: After receiving the information such as the encoding duration M, the encoding completion moment t1, the data amount, and the data type of the to-be-sent data packet A, the application interface layer generates an AT command (attention command) based on the information. Then, the application interface layer sends the AT command to the modem. The AT command is an interface control command used for communication between an application and a modem, and may carry information such as the encoding duration M, the encoding completion moment t1, the data amount, the data type, a protocol data unit (protocol data unit, PDU) session ID, and a quality of service (quality of service, QoS) flow ID of the to-be-sent data packet A.

S708: After receiving the AT command, the modem counts the data amount of the to-be-sent data packet A carried in the AT command into a corresponding logical channel, starts the timer, and triggers, at an expiration moment t2 of the timer, an SR that arrives in a next scheduling periodicity to perform uplink resource pre-application.

For a specific execution process of steps S705 to S708, refer to related content in steps S404 to S407 in the embodiment shown in FIG. 4A and FIG. 4B. Details are not described herein again.

S709: The electronic device 100 may send an SR request to the radio access network device 200 at the moment t2, to notify the radio access network device 200 that the electronic device 100 has uplink data to be sent.

Specifically, the moment t2 may be the sending moment T_SR1 of the SR1 in FIG. 6A to FIG. 6C. Before the encoding completion moment t1 of the to-be-sent data packet A arrives, the modem may send an SRL that is, an uplink scheduling request, to the radio access network device 200 at the sending moment T_SR1 of the SRL to perform uplink resource pre-application, so as to notify the radio access network device 200 that the electronic device 100 has uplink data to be sent.

S710: After receiving the SR request, the radio access network device 200 may schedule a PUSCH for the electronic device 100 based on a network resource status, and allocate a small quantity of uplink resources to the electronic device 100 by sending UL Grant 1, and the uplink resources may be used by the electronic device 100 to send a BSR in step S712 to the radio access network device 200.

Specifically, in the case shown in FIG. 6A, the arrival moment t1_packet (that is, the encoding completion moment t1 of the to-be-sent data packet A) of the to-be-sent data packet A is earlier than the arrival moment t_ulgrant I of the UL Grant I (that is, the UL Grant 1 in step S710), that is, before the radio access network device 200 schedules the PUSCH for the electronic device 100 and allocates a small quantity of uplink resources to the electronic device 100 by sending the UL Grant 1, the to-be-sent data packet A has arrived at the modem. Therefore, the electronic device 100 may send the BSR in step S712 by using a small quantity of uplink resources allocated by the radio access network device 200.

Optionally, in the case shown in FIG. 6B, the arrival moment t2 packet (that is, the encoding completion moment t1 of the to-be-sent data packet A) of the to-be-sent data packet A is later than the arrival moment t_ulgrant I of the UL Grant I (that is, the UL Grant 1 in step S810), that is, after the radio access network device 200 schedules the PUSCH for the electronic device 100 and allocates a small quantity of uplink resources to the electronic device 100 by sending the UL Grant 1, the to-be-sent data packet A arrives at the modem. In this case, between the moment t_ulgrant I and the moment t2_packet, the electronic device 100 may process, by using the padding data packet, the small quantity of uplink resources allocated by the radio access network device 200. Until the moment t2_packet, the electronic device 100 starts to send the BSR in step S712.

S711 to S714: At the encoding completion moment t1 of the to-be-sent data packet, the application in the electronic device 100 may send the to-be-sent data packet to the modem. The modem may send the BSR to the radio access network device 200 on the PUSCH. The BSR may include information such as the data amount of the to-be-sent data packet, and is used to notify the radio access network device 200 of how much uplink data needs to be sent by the electronic device 100. The radio access network device 200 may schedule the PUSCH based on the BSR, and allocate an uplink resource to the electronic device 100 by sending UL Grant 2. Step S712 and step S713 may be continuously performed until all uplink data (all data in the to-be-sent data packet A) of the electronic device 100 is sent. The electronic device 100 reports the BSR to the radio access network device 200, to notify the radio access network device 200 that no uplink data needs to be sent by the electronic device 100, and the radio access network device 200 stops scheduling the PUSCH.

S715 and S716: The electronic device 100 detects an operation of ending the video call by the user, for example, an operation of tapping an ending video call control on the application by the user, and the electronic device 100 may disable the camera and stop capturing video frames.

This embodiment of this application provides the uplink resource pre-application method. The electronic device may predict the information such as the encoding duration and the data amount of the to-be-sent data packet in the application (APP), and determine the encoding completion moment of the to-be-sent data packet. Then, the electronic device may determine whether the encoding completion moment of the to-be-sent data packet is earlier than the preset moment. If yes, the electronic device may send the uplink scheduling request to the radio access network device before the predicted encoding completion moment of the to-be-sent data packet arrives, to apply for the uplink resource for the to-be-sent data packet in advance. In other words, uplink resource pre-application is performed. In this case, when the encoding completion moment of the to-be-sent data packet arrives, the electronic device may send the to-be-sent data packet to the radio access network device by using the uplink resource that has been applied for. In this way, a latency of sending uplink data by the electronic device can be reduced, and a padding data packet waste can be reduced, thereby further reducing power consumption of the electronic device.

It should be noted that in this embodiment of this application, the uplink resource pre-application method is described in detail by using only the application scenario of the video call as an example, and is not limited to the application scenario of the video call. The uplink resource pre-application method provided in this embodiment of this application is also applicable to another application scenario (for example an audio call, a cloud game, or industrial sensor data collection and transmission). This is not limited herein.

Table 2 shows an example of latency benefits obtained by using the baseline solution (where uplink resource pre-application is not performed), a solution 1 (where uplink resource pre-application is performed, and a padding data packet waste is not considered) in this embodiment of this application, and a solution 2 (where uplink resource pre-application is performed, and a padding data packet waste is considered) in this embodiment of this application. A time deviation Δt of arrival of the to-be-sent data packet may be a time difference between the arrival moment t2_packet of the to-be-sent data packet A in the foregoing text description about FIG. 6B (or the arrival moment t3_packet of the to-be-sent data packet A in the foregoing text description about FIG. 6C) and the arrival moment t_ulgrant I of the UL Grant I.

In this embodiment of this application, it is assumed that the SR periodicity T_SR is configured as 80 ms. Refer to Table 2. That the time deviation Δt of the arrival of the to-be-sent data packet is within a range of 1 ms to 39 ms indicates that the encoding completion moment t1 of the to-be-sent data packet is earlier than the preset moment t' (for example, the case 2 shown in FIG. 6B). That the time deviation Δt of the arrival of the to-be-sent data packet is within a range of 41 ms to 79 ms indicates that the encoding completion moment t1 of the to-be-sent data packet is later than the preset moment t' (for example, the case 3 shown in FIG. 6C).

When the radio access network device 200 disables pre-scheduling, and a transmit end and a receive end are in a same cellular cell, in this embodiment of this application, it is assumed that total duration T_BSR consumed for applying for and sending a BSR of the to-be-sent data packet is 5 ms. As shown in Table 2, the following separately describes in detail a latency of the baseline solution, a latency of the solution 1 in this embodiment of this application, and a latency of the solution 2 in this embodiment of this application.

1. Baseline solution (where uplink resource pre-application not performed):

For example, if a time deviation Δt of the arrival of the to-be-sent data packet is 1 ms, the latency of the baseline solution is $\Delta T0 = T\_SR - \Delta t + T\_BSR = 80\text{ ms} - 1\text{ ms} + 5\text{ ms} = 84$ ms. It may be learned from Table 2 that, if the time deviation Δt of the arrival of the to-be-sent data packet is different, the latency ΔT0 of the baseline solution is also different. In general, an average latency of the baseline solution is 45 ms.

2. Solution 1 in this embodiment of this application (where uplink resource pre-application is performed, and a padding data packet waste is not considered):

If a padding data packet waste is not considered, the latency of the solution 1 in this embodiment of this application is ΔT1=T_BSR=5 ms. In other words, when the time deviation Δt of the arrival of the to-be-sent data packet is within a range of 1 ms to 79 ms, uplink resource pre-application is performed regardless of whether the encoding completion moment t1 of the to-be-sent data packet is earlier than the preset moment t' or later than the preset moment t'. Therefore, the latency ΔT1 does not change with a change of the time deviation Δt of the to-be-sent data packet, and is 5 ms. In general, in comparison with the baseline solution, a total average latency benefit obtained by using the solution 1 in this embodiment of this application is 40 ms.

3. Solution 2 in this embodiment of this application (where whether uplink resource pre-application is performed is determined, and a padding data packet waste is considered):

If a padding data packet waste is considered, uplink resource pre-application is performed when the time deviation Δt of the to-be-sent data packet is within the range of 1 ms to 39 ms, that is, the encoding completion moment t1 of the to-be-sent data packet is earlier than the preset moment t' (the case 2 shown in FIG. 6B). The latency of the solution 2 of this embodiment of this application is ΔT2=T_BSR=5 ms, the time deviation does not change with the change of the time deviation Δt of the to-be-sent data packet, and is 5 ms. When the time deviation Δt of the to-be-sent data packet is within the range of 41 ms to 79 ms, that is, the encoding completion moment t1 of the to-be-sent data packet is later than the preset moment t' (the case 3 shown in FIG. 6C), the uplink resource pre-application is not performed (that is, the baseline solution is used). In this case, the latency of the solution 2 of this application is ΔT2=T_SR−Δt+T_BSR, which is the same as that in the baseline solution. In general, in comparison with the baseline solution, a total average latency benefit obtained by using the solution 2 in this embodiment of this application is 30 ms.

It may be learned from the foregoing analysis result that, in comparison with the baseline solution, a sending latency of the to-be-sent data packet is reduced by using both the solution 1 and the solution 2 in embodiments of this application. The latency benefit of the solution 1 in embodiments of this application is relatively large, but the padding data packet waste may be increased. The latency benefit of the solution 2 in embodiments of this application is less than that in the solution 1, but the padding data packet waste is reduced. Therefore, the solution 1 and the solution 2 in embodiments of this application may be selected based on different requirements. For example, if a latency requirement is high, the solution 1 in embodiments of this application may be selected. If a latency and a padding data packet waste are comprehensively considered, the solution 2 in embodiments of this application may be selected.

It should be noted that a specific value setting in Table 2 is merely an example, and should not constitute a limitation on this application.

TABLE 2

| Time deviation Δt (ms) of the to-be-sent data packet | Latency ΔT0 (ms) of the baseline solution (where uplink resource pre-application is not performed) | Latency ΔT1 (ms) of the solution 1 in embodiments of this application (where uplink resource pre-application is performed, and a padding data packet waste is not considered) | Latency ΔT2 (ms) of the solution 2 in embodiments of this application (where uplink resource pre-application is performed, and a padding data packet waste is not considered) |
|---|---|---|---|
| 1; 9 | 84 = 80 − 1 + 5; 76 = 80 − 9 + 5 | 5; 5 | 5; 5 |
| 11; 19 | 74 = 80 − 11 + 5; 66 = 80 − 19 + 5 | 5; 5 | 5; 5 |
| 21; 29 | 64 = 80 − 21 + 5; 56 = 80 − 29 + 5 | 5; 5 | 5; 5 |
| 31; 39 | 54 = 80 − 31 + 5; 46 = 80 − 39 + 5 | 5; 5 | 5; 5 |
| 41; 49 | 44 = 80 − 41 + 5; 36 = 80 − 49 + 5 | 5; 5 | 44 = 80 − 41 + 5; 36 = 80 − 49 + 5 |
| 51; 59 | 34 = 80 − 51 + 5; 26 = 80 − 59 + 5 | 5; 5 | 34 = 80 − 51 + 5; 26 = 80 − 59 + 5 |
| 61; 69 | 24 = 80 − 61 + 5; 16 = 80 − 69 + 5 | 5; 5 | 24 = 80 − 61 + 5; 16 = 80 − 69 + 5 |
| 71; 79 | 14 = 80 − 71 + 5; 6 = 80 − 79 + 5 | 5; 5 | 14 = 80 − 71 + 5; 6 = 80 − 79 + 5 |
| | Average latency: 49 = (84 + 74 + 64 + 54 + 44 + 34 + 24 + 14)/8; 41 = (76 + 66 + 56 + 46 + 36 + 26 + 16 + 6)/8 | Average latency: 5 = (5 + 5 + 5 + 5 + 5 + 5 + 5 + 5)/8; 5 = (5 + 5 + 5 + 5 + 5 + 5 + 5 + 5)/8 | Average latency: 17 = (5 + 5 + 5 + 5 + 44 + 34 + 24 + 14)/8; 13 = (5 + 5 + 5 + 5 + 36 + 26 + 16 + 6)/8 |
| | | Average latency benefit: 44 = 49 − 5; 36 = 41 − 5 | Average latency benefit: 32 = 49 − 17; 28 = 41 − 13 |
| | Total average latency: 45 = (49 + 41)/2 | Total average latency benefit: 40 = (44 + 36)/2 | Total average latency benefit: 30 = (32 + 28)/2 |

Figure 8:
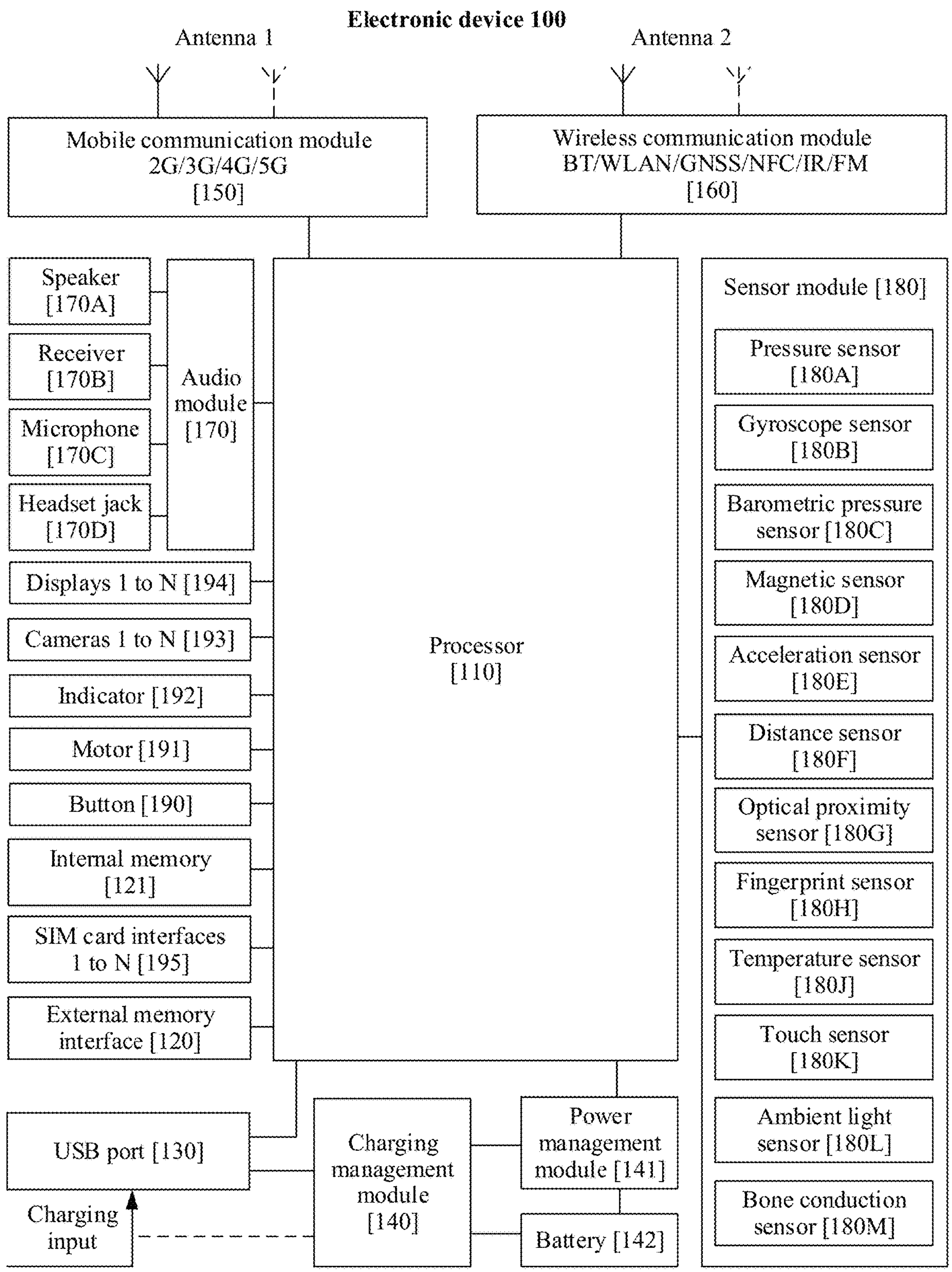
FIG. 8 is a schematic diagram of a structure of an electronic device according to an embodiment of this application.

FIG. 8 shows an example of a structure of an electronic device 100 according to an embodiment of this application.

As shown in FIG. 8, the electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present disclosure does not constitute a specific limitation on the electronic device 100. In other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction executing.

The memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting duration of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes a serial data line (serial data line, SDA) and a derail clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be configured to perform the audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), or the like. In some embodiments, the processor 110 communicates with the camera 193 through the CSI to implement a photographing function of the electronic device 100. The processor 110 communicates with the display 194 through the DSI interface to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be a mini USB port, a micro USB port, a USB type-C port, or the like. The USB port 130 may be configured to be connected to the charger to charge the electronic device 100, or may be configured to transmit data between the electronic device 100 and a peripheral device. Alternatively, the USB port 130 may be configured to connect to a headset for playing audio through the headset. Alternatively, the port may be configured to connect to another electronic device, for example, an AR device.

It may be understood that an interface connection relationship between the modules that is shown in this embodiment of the present disclosure is merely an example for description, and does not constitute a limitation on a structure of the electronic device 100. In other embodiments of this application, the electronic device 100 may alternatively use an interface connection mode different from that in the foregoing embodiment, or use a combination of a plurality of interface connection modes.

The charging management module 140 is configured to receive a charging input from the charger. The charger may be a wireless charger or a wired charger. In some embodiments of wired charging, the charging management module 140 may receive charging input of the wired charger through the USB port 130. In some embodiments in which wireless charging is used, the charging management module 140 may receive a wireless charging input through a wireless charging coil of the electronic device 100. The charging management module 140 may further supply power to the electronic device 100 through the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may be further configured to monitor a parameter such as a battery capacity, a quantity of battery cycles, or a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), or the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert, by using the antenna 1, the signal into an electromagnetic wave for radiation. In some embodiments, at least some functional modules in the mobile communication module 150 may be disposed in the processor 110. In some embodiments, at least some functional modules of the mobile communication module 150 may be disposed in a same device with at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then the demodulator transfers the low-frequency baseband signal obtained through demodulation to the baseband processor for processing. After being processed by the baseband processor, the low-frequency baseband signal is transmitted to the application processor. The application processor outputs a sound signal by using an audio device (not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device with the mobile communication module 150 or another function module.

The wireless communication module 160 may provide a wireless communication solution such as a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like that is applied to the electronic device 100. The wireless communication module 160 may be one or more components integrating at least one communication processing module. The wireless communication module 160 receives an electromagnetic wave through the antenna 2, performs frequency modulation and filtering processing on an electromagnetic wave signal, and sends the processed signal to the processor 110. The wireless communication module 160 may further receive a to-be-sent signal from the processor 110, perform frequency modulation and amplification on the to-be-sent signal, and convert, by using the antenna 2, the signal into an electromagnetic wave for radiation.

In some embodiments, the antenna 1 of the electronic device 100 is coupled to the mobile communication module 150, and the antenna 2 is coupled to the wireless communication module 160, so that the electronic device 100 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements the display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, and the GPUs execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is enabled. Light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, or complexion of the image. The ISP may further optimize parameters such as exposure or a color temperature of a shooting scene. In some embodiments, the ISP may be disposed in the camera 193.

The camera 193 is configured to capture a static image or a video. An object generates, through the lens, an optical image, and the optical image is projected to the photosensitive element. The photosensitive element may be a charge coupled device (charge coupled device, CCD) or a complementary metal-oxide-semiconductor (complementary metal-oxide-semiconductor, CMOS) optoelectronic transistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG) 1, MPEG2, MPEG3, or MPEG4.

The NPU is a neural-network (neural-network, NN) computing processor that quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, or text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as a music file and a video file are stored in the external storage card.

The internal memory 121 may be configured to store computer-executable program code. The executable program code includes instructions. The processor 110 runs the instructions stored in the internal memory 121, to perform various functional applications and data processing of the electronic device 100. The internal memory 121 may include a program storage area and a data storage area. The program storage area may store an operating system, an application required by at least one function (for example, a voice playing function or an image playing function), or the like. The data storage area may store data (for example, audio data, or a phone book) created in a process of using the electronic device 100, or the like. In addition, the internal memory 121 may include a high-speed random access memory, and may further include a nonvolatile memory, for example, at least one magnetic disk storage device, a flash storage device, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an electrical audio signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "microphone", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to implement sound signal collection, noise reduction, and further, sound source identifying, to implement a directional recording function or the like.

The headset jack 170D is configured to connect to a wired headset. The headset jack 170D may be the USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The button 190 includes a power button, a volume button, or the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing or audio playing) may correspond to different vibration feedback effects. The motor 191 may also correspond to different vibration feedback effects for touch operations performed on different areas of the display 194. Different application scenarios (for example, a time reminder, information receiving, an alarm clock, or a game) may also correspond to different vibration feedback effects. Customized touch vibration feedback effect may be further supported.

The indicator 192 may be an indicator light, and may be configured to indicate a charging status or a power change, or may be configured to indicate a message, a missed call, a notification, or the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, or the like. A plurality of cards may be simultaneously inserted into a same SIM card interface 195. The plurality of cards may be of a same type or of different types. The SIM card interface 195 is compatible to different types of SIM cards. The SIM card interface 195 is also compatible to an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and may not be separated from the electronic device 100.

It should be understood that the electronic device 100 shown in FIG. 8 is merely an example, and the electronic device 100 may have more or fewer components than those shown in FIG. 8, or may combine two or more components, or may have different component configurations. Various parts shown in FIG. 8 may be implemented in hardware that includes one or more signal processing and/or application-specific integrated circuits, in software, or in a combination of hardware and software.

Figures 9, 10:
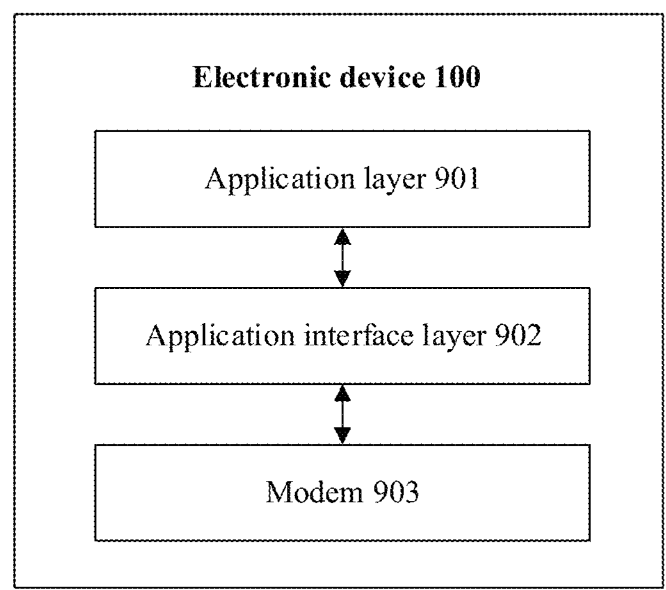
FIG. 9 is a schematic diagram of another structure of an electronic device according to an embodiment of this application.
FIG. 10 is a schematic diagram of another structure of an electronic device according to an embodiment of this application.

FIG. 9 shows an example of another structure of the electronic device according to this embodiment of this application.

As shown in FIG. 9, the electronic device 100 may include an application layer 901, an application interface layer 902, and a modem 903.

The application layer 901 may include a series of applications. The applications (which may also be referred to as apps) may include a camera, a gallery, a call, a video, music, Bluetooth, an SMS message, a calendar, navigation, a map, and the like. In the method in each embodiment of this application, the application in the application layer 901 may provide an audio and video encoding function. For example, an application WeChat may provide a video call function, and may capture video frames, and encode the captured video frames to generate a to-be-sent data packet.

The application interface layer 902 may provide a standard interface for the application layer 901, and the interface may be used for communication between the application layer 901 and the modem 903. For example, in the method in each embodiment of this application, the application interface layer 902 may provide a first interface, and the first interface may be used by the application layer 901 to transmit information such as the encoding duration M of the to-be-sent data packet A in the foregoing embodiments to the application interface layer 902. For another example, in the method in each embodiment of this application, the application interface layer 902 may further provide a second interface. The second interface may be used by the application interface layer 902 to transmit a generated AT command to the modem 903.

The modem 903 may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. In the method in each embodiment of this application, the modem 903 may receive the AT command through the second interface provided by the application interface layer 902, then start a timer, and send an uplink scheduling request to a network device at an expiration moment of the timer, to perform uplink resource pre-application. The modem 903 may further send, by using an uplink resource allocated by the network device, a to-be-sent data packet generated by the application 901.

FIG. 10 shows an example of another structure of the electronic device according to this embodiment of this application.

As shown in FIG. 10, the electronic device 100 may include a processor 1001, a receiver 1002, a transmitter 1003, a memory 1004, and a bus 1005. The processor 1001 includes one or more processing cores, and by running a software program and a module, the processor 1001 implements applications of various functions and information processing. The receiver 1002 and the transmitter 1003 may be implemented as one communication component, and the communication component may be a baseband chip. The memory 1004 is connected to the processor 1001 by using the bus 1005. The memory 1004 may be configured to store at least one program instruction, and the processor 1001 is configured to execute the at least one program instruction, to implement the technical solution of the foregoing embodiment. The implementation principle and the technical effect are similar to those in the foregoing method-related embodiments, and details are not described herein again.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by a combination of hardware and software modules in the processor.

In this embodiment of this application, the memory may be a non-volatile memory, for example, a hard disk drive (hard disk drive, HDD) or a solid-state drive (solid-state drive, SSD), or may be a volatile memory (volatile memory), for example, a random access memory (random-access memory, RAM). The memory is any other medium that may carry or store expected program code in a form of an instruction structure or a data structure and that can be accessed by a computer, but is not limited thereto.

The memory in embodiments of this application may alternatively be a circuit or any other apparatus that may implement a storage function, and is configured to store program instructions and/or data. All or a part of the method provided in embodiments of this application may be implemented by using software, hardware, firmware, or any combination of software and hardware. When software is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk drive, or a magnetic tape), an optical medium (for example, a digital video disc (digital video disc, DVD)), a semiconductor medium (for example, an SSD), or the like.

The foregoing embodiments are merely intended for describing the technical solutions of this application other than limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A communication method, comprising: encoding, by an electronic device, to- be-sent data to generate a to-be-sent data packet; predicting, by the electronic device, at an encoding start moment to of the to-be-sent data packet, encoding duration M of the to-be-sent data packet, and determining an encoding completion moment t1 of the to-be-sent data packet based on the encoding duration M of the to-be-sent data packet; starting, by the electronic device, a timer having an expiration moment t2 of the timer earlier than the encoding completion moment t1 of the to-be-sent data packet, wherein a time interval from the expiration moment t2 of the timer to a moment of sending a first scheduling request (SR) after the encoding completion moment t1 of the to-be-sent data packet is one SR periodicity; sending, by the electronic device, an SR to a network device at the expiration moment t2 of the timer; receiving, by the electronic device, uplink grant information sent by the network device;

and sending, by the electronic device, the to-be-sent data packet at the encoding completion moment t1 of the to-be-sent data packet by using an uplink resource indicated by the uplink grant information, wherein the expiration moment t2 of the timer is equal to a start moment t3 of the timer plus duration T of the timer, and the duration T of the timer is equal to duration from the start moment t3 of the timer to the encoding completion moment t1 of the to-be-sent data packet minus a time interval M3;

and the encoding completion moment t1 of the to-be-sent data packet is equal to the encoding start moment t0 of the to-be-sent data packet plus the encoding duration M of the to-be-sent data packet;

and the time interval M3 is equal to a time interval M1 plus a time interval M2, wherein the time interval M1 is a time interval from the expiration moment t2 of the timer to a moment at which the electronic device receives the uplink grant information, and the time interval M2 is a time interval from the moment at which the electronic device receives the uplink grant information to the encoding completion moment t1 of the to-be-sent data packet.

2. The method of claim 1, the method further comprising: determining, by the electronic device, at least one of the time interval M1 or the time interval M2 based on one or more network configuration parameters from the network device.

3. The method of claim 1, wherein the electronic device comprises: an application layer, a modem, and an application interface layer used for communication between the application layer and the modem, the application interface layer provides a first interface used by the application layer to transmit the encoding completion moment t1 of the to-be-sent data packet to the application interface layer.

4. The method of claim 1, wherein the electronic device comprises: an application layer, a modem, and an application interface layer used for communication between the application layer and the modem, the application interface layer provides a second interface used by the application interface layer to transmit an attention (AT) command to the modem, wherein the AT command carries at least one of the encoding completion moment t1 of the to-be-sent data packet, and the AT command is used to instruct the modem to start the timer.

5. The method according to claim 1, wherein the step of sending the SR to the network device at the expiration moment t2 of the timer is performed on the following condition: the encoding completion moment t1 of the to-be-sent data packet is earlier than a first moment, the first moment is equal to the expiration moment t2 of the timer plus a time interval M1 and a half of the SR periodicity, and the time interval M1 is a time interval from the expiration moment t2 of the timer to the moment at which the electronic device receives the uplink grant information.

6. The method of claim 1, wherein the to-be-sent data is image data captured by the electronic device.

7. The method of claim 1, wherein the sending the to-be-sent data packet at the encoding completion moment t1 of the to-be-sent data packet by using an uplink resource indicated by the uplink grant information comprises: if an arrival moment of the uplink grant information is earlier than the expiration moment t2, using, by the electronic device, a padding data packet to process an uplink resource allocated by the network device.

8. An electronic device, comprising: one or more processors; and a non-transitory memory configured to store processor-executable instructions that, when executed by the one or more processors, cause the electronic device to perform: encoding to-be-sent data to generate a to-be-sent data packet; predicting at an encoding start moment t0 of the to-be-sent data packet, encoding duration M of the to-be-sent data packet; determining an encoding completion moment t1 of the to-be-sent data packet based on the encoding duration M of the to-be-sent data packet; starting a timer having an expiration moment t2 earlier than the encoding completion moment t1 of the to-be-sent data packet, wherein a time interval from the expiration moment t2 of the timer to a moment of sending a first scheduling request (SR) after the encoding completion moment t1 of the to-be-sent data packet is one SR periodicity; sending an SR to a network device at the expiration moment t2 of the timer; receiving uplink grant information sent by the network device; and sending the to-be-sent data packet at the encoding completion moment t1 of the to-be-sent data packet by using an uplink resource indicated by the uplink grant information, wherein the expiration moment t2 of the timer is equal to a start moment t3 of the timer plus duration T of the timer, and the duration T of the timer is equal to duration from the start moment t3 of the timer to the encoding completion moment t1 of the to-be-sent data packet minus a time interval M3; and the encoding completion moment t1 of the to-be-sent data packet is equal to the encoding start moment to of the to-be-sent data packet plus the encoding duration M of the to-be-sent data packet; and the time interval M3 is equal to a time interval M1 plus a time interval M2, wherein the time interval M1 is a time interval from the expiration moment t2 of the timer to a moment at which the electronic device receives the uplink grant information, and the time interval M2 is a time interval from the moment at which the electronic device receives the uplink grant information to the encoding completion moment t1 of the to-be-sent data packet.

9. The electronic device of claim 8, wherein the processor-executable instructions further cause the electronic device to perform: determining at least one of the time interval M1 or the time interval M2 based on one or more network configuration parameters from the network device.

10. The electronic device according to claim 8, wherein the electronic device comprises: an application layer, a modem, and an application interface layer used for communication between the application layer and the modem, the application interface layer provides a first interface used by the application layer to transmit the encoding completion moment t1 of the to-be-sent data packet to the application interface layer.

11. The electronic device of claim 8, wherein the electronic device comprises: an application layer, a modem, and an application interface layer used for communication between the application layer and the modem, the application interface layer provides a second interface used by the application interface layer to transmit an attention (AT) command to the modem, wherein the AT command carries the encoding completion moment t1 of the to-be-sent data packet, and the AT command is used to instruct the modem to start the timer.

12. The electronic device of claim 8, wherein the step of the sending the SR to the network device at the expiration moment t2 of the timer is performed under the following condition: the encoding completion moment t1 of the to-be-sent data packet is earlier than a first moment, the first moment is equal to the expiration moment t2 of the timer plus the time interval M1 and a half of the SR periodicity, and the time interval ML is the time interval from the expiration moment t2 of the timer to the moment at which the electronic device receives the uplink grant information.

13. The electronic device of claim 8, wherein the to-be-sent data is image data captured by the electronic device.

14. The electronic device of claim 8, wherein the sending the to-be-sent data packet at the encoding completion moment t1 of the to-be-sent data packet by using an uplink resource indicated by the uplink grant information comprises: if an arrival moment of the uplink grant information is earlier than the expiration moment t2, using, by the electronic device, a padding data packet to process an uplink resource allocated by the network device.

15. Anon-transitory memory, comprising instructions, wherein when the instructions are run on an electronic device, the electronic device is enabled to perform the following steps: encoding to-be-sent data to generate a to-be-sent data packet; predicting at an encoding start moment t0 of the to-be-sent data packet, encoding duration M of the to-be-sent data packet, and determining an encoding completion moment t1 of the to-be-sent data packet based on the encoding duration M of the to-be-sent data packet; starting a timer having an expiration moment t2 earlier than the encoding completion moment t1 of the to-be-sent data packet, wherein a time interval from the expiration moment t2 of the timer to a moment of sending a first scheduling request (SR) after the encoding completion moment t1 of the to-be-sent data packet is one SR periodicity; sending an SR to a network device at the expiration moment t2 of the timer; receiving uplink grant information sent by the network device; and sending the to-be-sent data packet at the encoding completion moment t1 of the to-be-sent data packet by using an uplink resource indicated by the uplink grant information, wherein the expiration moment t2 of the timer is equal to a start moment t3 of the timer plus duration T of the timer, and the duration T of the timer is equal to duration from the start moment t3 of the timer to the encoding completion moment t1 of the to-be-sent data packet minus a time interval M3; and the encoding completion moment t1 of the to-be-sent data packet is equal to the encoding start moment to of the to-be-sent data packet plus the encoding duration M of the to-be-sent data packet; and the time interval M3 is equal to a time interval M1 plus a time interval M2, wherein the time interval M1 is a time interval from the expiration moment t2 of the timer to a moment at which the electronic device receives the uplink grant information, and the time interval M2 is a time interval from the moment at which the electronic device receives the uplink grant information to the encoding completion moment t1 of the to-be-sent data packet.

16. The non-transitory memory of claim 15, wherein at least one of the time interval M1 or the time interval M2 is determined by the electronic device based on one or more network configuration parameters from the network device.

17. The non-transitory memory of claim 15, wherein the sending the to-be-sent data packet at the encoding completion moment t1 of the to-be-sent data packet by using an uplink resource indicated by the uplink grant information comprises: if an arrival moment of the uplink grant information is earlier than the expiration moment t2, using, by the electronic device, a padding data packet to process an uplink resource allocated by the network device.

* * * * *